(12) United States Patent
Edmiston et al.

(10) Patent No.: US 11,406,981 B2
(45) Date of Patent: Aug. 9, 2022

(54) DETECTION INSTRUMENTS WITH AUTOMATED CELL LOCATION SELECTION FOR NEWLY INTAKEN SPECIMEN CONTAINERS AND RELATED METHODS

(71) Applicant: bioMerieux, Inc., Durham, NC (US)

(72) Inventors: Michael Edmiston, Manchester, MO (US); Jonathan Elenkiwich, Lyons (FR); Warren Vincent, Maryland Heights, MO (US)

(73) Assignee: BIOMERIEUX, INC., Durham, NC (US)

( * ) Notice: Subject to any disclaimer, the term of this patent is extended or adjusted under 35 U.S.C. 154(b) by 316 days.

(21) Appl. No.: 16/546,756

(22) Filed: Aug. 21, 2019

(65) Prior Publication Data
US 2020/0061605 A1 Feb. 27, 2020

Related U.S. Application Data

(60) Provisional application No. 62/720,964, filed on Aug. 22, 2018.

(51) Int. Cl.
*B01L 3/00* (2006.01)
*G01N 35/00* (2006.01)
*G01N 35/10* (2006.01)

(52) U.S. Cl.
CPC ........... *B01L 3/5085* (2013.01); *B01L 3/5082* (2013.01); *G01N 35/00613* (2013.01); *G01N 35/10* (2013.01); *G01N 2035/00277* (2013.01)

(58) Field of Classification Search
CPC ........ B01L 3/5085; B01L 3/5082; B01L 9/06; B01L 2200/14; G01N 35/00613;
(Continued)

(56) References Cited

U.S. PATENT DOCUMENTS 5,362,648 A * 11/1994 Koreyasu ......... G01N 35/00732
422/63
5,536,935 A 7/1996 Klotzsch et al.
(Continued)

FOREIGN PATENT DOCUMENTS

JP 2012526559 A 11/2012
JP 2013088114 A 5/2013
(Continued)

OTHER PUBLICATIONS

International Search Report and Written Opinion of PCT/US19/47380, dated Nov. 12, 2019.
(Continued)

*Primary Examiner* — Jill A Warden
*Assistant Examiner* — John McGuirk

(57) ABSTRACT

Automated test instruments electronically determine and/or obtain cell availability of cells of a holding structure in an incubated test chamber and for each of a plurality of open and available cells and electronically identify neighboring cells, electronically determining whether each of the identified neighboring cells are occupied or empty and, if occupied, electronically evaluating at least one of a test status or a time from load of a specimen container held therein. The instruments then electronically rank each of the plurality of open and available cells based at least in part on whether the identified neighboring cells are occupied or empty and the at least one of test status or time from load of the occupied cells of the identified neighboring cells. The loading mechanism is then directed to load an incoming specimen container into a selected one of the open and available cells based on the ranking.

15 Claims, 19 Drawing Sheets

(58) Field of Classification Search
CPC ......... G01N 35/10; G01N 2035/00277; G01N 2035/00465; G01N 2035/0406; G01N 2035/0463; G01N 2035/0491; G01N 35/04; G01N 2035/00356; G01N 2035/0465; G01N 35/0099; G05B 2219/40078

See application file for complete search history.

(56) References Cited

U.S. PATENT DOCUMENTS

| | | | |
|---|---|---|---|
| 5,542,004 | A | 7/1996 | Constant et al. |
| 6,629,449 | B1 | 10/2003 | Kline-Schoder et al. |
| 6,642,019 | B1 | 11/2003 | Anderson et al. |
| 7,218,393 | B2 | 5/2007 | Sharpe et al. |
| 7,693,322 | B2 | 4/2010 | Carroll et al. |
| 7,850,914 | B2 | 12/2010 | Veiner et al. |
| 7,876,935 | B2 | 1/2011 | Massaro |
| 8,036,444 | B2 | 10/2011 | Nielsen |
| 8,649,605 | B2 | 2/2014 | Franz |
| 8,865,630 | B2 | 10/2014 | Yanik et al. |
| 9,677,993 | B2 | 6/2017 | Nugent et al. |
| 9,909,969 | B2 | 3/2018 | Halverson et al. |
| 9,922,429 | B2 | 3/2018 | Milne et al. |
| 10,012,664 | B2 | 7/2018 | Wasson et al. |
| 10,274,506 | B2 | 4/2019 | Noda et al. |
| 10,395,357 | B2 | 8/2019 | Vivet et al. |
| 10,614,286 | B2 | 4/2020 | Bolea et al. |
| 2002/0147515 | A1 | 10/2002 | Fava et al. |
| 2002/0198928 | A1 | 12/2002 | Bukshpan et al. |
| 2004/0134750 | A1 | 7/2004 | Luoma, II |
| 2005/0196320 | A1 | 9/2005 | Veiner et al. |
| 2005/0219523 | A1 | 10/2005 | Onuma et al. |
| 2006/0210139 | A1 | 9/2006 | Carroll et al. |
| 2007/0292844 | A1 | 12/2007 | Tilles |
| 2008/0001104 | A1 | 1/2008 | Voigt et al. |
| 2008/0160502 | A1 | 7/2008 | Barnes et al. |
| 2008/0190953 | A1 | 8/2008 | Mallett et al. |
| 2008/0221498 | A1 | 9/2008 | Ogihara et al. |
| 2008/0230720 | A1 | 9/2008 | Nielsen |
| 2010/0291619 | A1 | 11/2010 | Robinson et al. |
| 2010/0311108 | A1 | 12/2010 | Bishop et al. |
| 2011/0102542 | A1 | 5/2011 | Chen et al. |
| 2011/0104685 | A1 | 5/2011 | Takenaka et al. |
| 2011/0124028 | A1 | 5/2011 | Robinson et al. |
| 2011/0124029 | A1 | 5/2011 | Robinson et al. |
| 2011/0124030 | A1 | 5/2011 | Philipak et al. |
| 2011/0124038 | A1 | 5/2011 | Bishop et al. |
| 2011/0124096 | A1 | 5/2011 | Philipak et al. |
| 2011/0125314 | A1 | 5/2011 | Robinson et al. |
| 2011/0233410 | A1 | 9/2011 | Niedermeier |
| 2011/0268329 | A1 | 11/2011 | Pronkine |
| 2012/0021455 | A1 | 1/2012 | Clay |
| 2012/0122705 | A1 | 5/2012 | Ting |
| 2012/0140230 | A1 | 6/2012 | Miller |
| 2012/0196320 | A1 | 8/2012 | Seibel et al. |
| 2013/0252271 | A1 | 9/2013 | Ullery |
| 2013/0257238 | A1 | 10/2013 | Herron et al. |
| 2013/0260448 | A1 | 10/2013 | Wilson et al. |
| 2013/0274913 | A1 | 10/2013 | Wilson et al. |
| 2013/0310969 | A1 | 11/2013 | Terzini et al. |
| 2013/0315486 | A1 | 11/2013 | Franz et al. |
| 2014/0170735 | A1 | 6/2014 | Holmes |
| 2014/0227723 | A1 | 8/2014 | Ingber et al. |
| 2014/0234949 | A1 | 8/2014 | Wasson |
| 2014/0342465 | A1 | 11/2014 | Haechler et al. |
| 2015/0177268 | A1* | 6/2015 | Reisch ................. G01N 35/025 436/180 |
| 2015/0368606 | A1 | 12/2015 | Bishop et al. |
| 2016/0006928 | A1 | 1/2016 | Gibbons et al. |
| 2016/0061851 | A1 | 3/2016 | Yamakawa et al. |
| 2016/0069919 | A1 | 3/2016 | Holmes et al. |
| 2016/0310941 | A1 | 10/2016 | Rajagopal et al. |
| 2018/0003728 | A1 | 1/2018 | Satou et al. |
| 2018/0364268 | A1 | 12/2018 | Kluckner et al. |
| 2019/0250180 | A1* | 8/2019 | Pollack .................... B25J 15/02 |
| 2019/0317117 | A1* | 10/2019 | Inoue ................... G01N 35/025 |
| 2021/0142037 | A1 | 5/2021 | Robinson et al. |

FOREIGN PATENT DOCUMENTS

| | | |
|---|---|---|
| JP | 2016050934 A | 8/2014 |
| WO | 9308914 A1 | 5/1993 |
| WO | 2010132741 A2 | 11/2010 |
| WO | 2015111526 A1 | 7/2015 |
| WO | 2018013345 A1 | 1/2018 |
| WO | 2018013346 A1 | 1/2018 |

OTHER PUBLICATIONS

International Search Report and Written Opinion of PCT/US17/34718, dated Aug. 25, 2017.
International Search Report and Written Opinion of PCT/US17/34741, dated Sep. 27, 2017.
International Search Report and Written Opinion of PCT/US17/34692, dated Aug. 15, 2017.
Supplementary European Search Report of Application No. 17803676.0, dated Jan. 2, 2020.
Supplementary European Search Report of Application No. EP19850948., dated May 9, 2022.

* cited by examiner

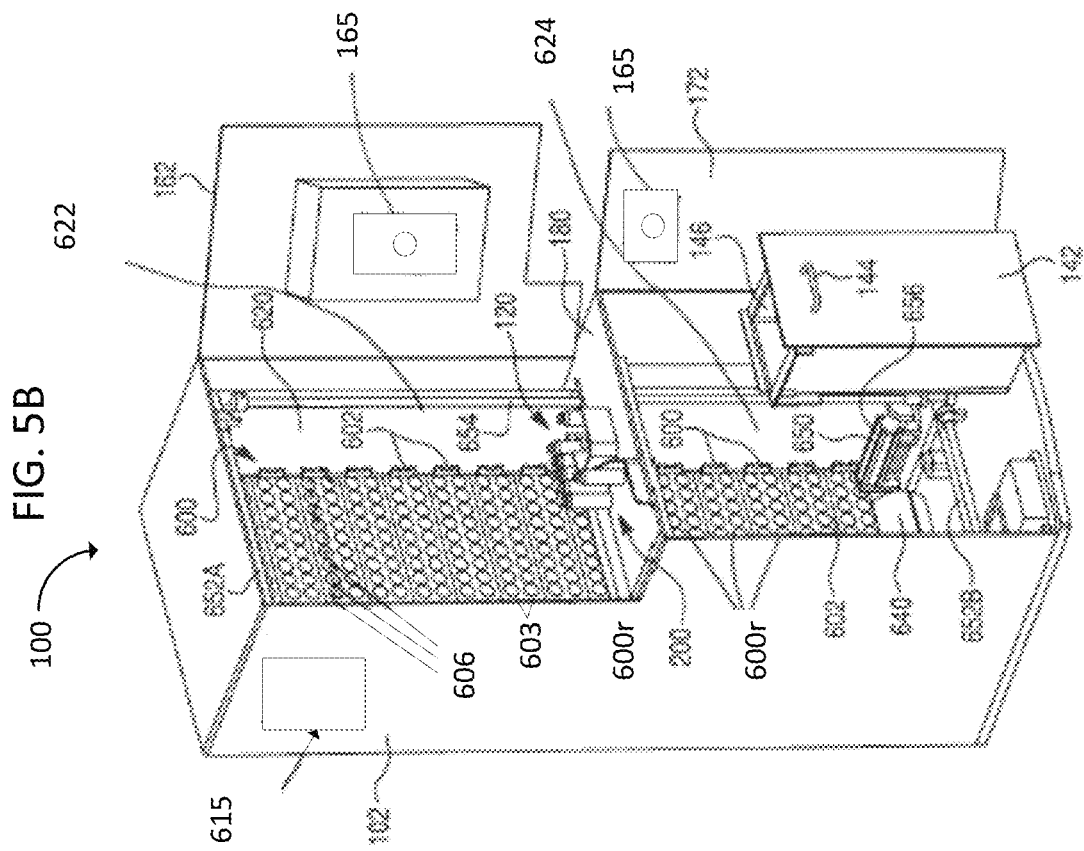
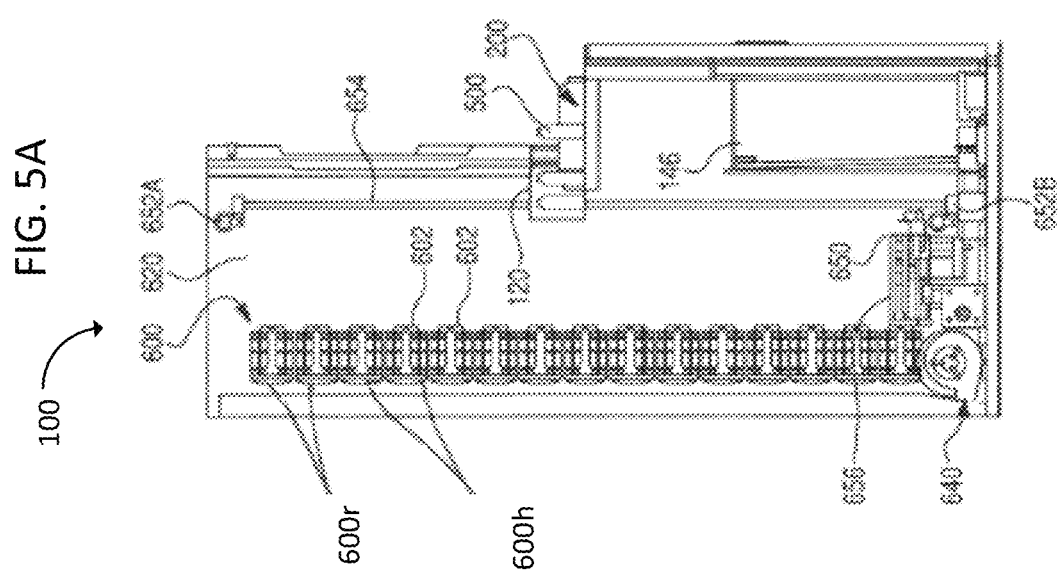

5.6 Effects of bottle volume on reflectance changes
  5.6.1 A bottle with no added blood is loaded next to an incubated bottle inoculated with 5mL of blood. The reflectance increase is approximately 80 counts.

5.6.2 A bottle inoculated with 5mL of blood is loaded next to an incubated bottle inoculated with 5mL of blood. The reflectance increase is approximately 130 counts.

DETECTION INSTRUMENTS WITH AUTOMATED CELL LOCATION SELECTION FOR NEWLY INTAKEN SPECIMEN CONTAINERS AND RELATED METHODS

FIELD OF THE INVENTION

The present invention is directed to systems and methods for identifying open cells of automated detection apparatuses that are suitable for loading newly intaken specimen containers.

BACKGROUND OF THE INVENTION

Instruments currently exist on the market in the U.S. that detect the growth of a microorganism in a biological sample. One such instrument is the BACT/ALERT® VIRTUO® microbial test instrument sold by bioMérieux, Inc. The instrument can receive a specimen container such as a blood culture bottle containing a blood sample from an animal or human patient. The instrument incubates the bottle and periodically during incubation an optical detection unit in the incubator analyzes a colorimetric sensor incorporated into the bottle to detect whether microbial growth has occurred within the bottle. The optical detection unit, bottles, and sensors are described in the patent literature. See, U.S. Pat. Nos. 4,945,060; 5,094,955; 5,162,229; 5,164,796; 5,217,876; 5,795,773; and 5,856,175, the entire content of each of which is incorporated by reference herein. Other prior art of interest relating generally to the detection of microorganisms in a biological sample include the following patents: U.S. Pat. Nos. 5,770,394, 5,518,923; 5,498,543, 5,432,061, 5,371,016, 5,397,709, 5,344,417; 5,374,264; 6,709,857; and 7,211,430, the entire content of each of which is incorporated by reference herein.

Other test instruments use other sensors and microbial detection devices, such as infrared sensors and fluorescent indicators for samples in specimen containers. For example, detection can be accomplished using intrinsic fluorescence of the microorganism, and/or detection of changes in the optical scattering of the media. See, e.g., U.S. Pat. No. 8,512,975, the content of which is hereby incorporated by reference as if recited in full herein. Yet other detection instruments detect or sense the generation of volatile organic compounds in the media or headspace of the container.

Certain events during testing in a detection instrument can cause a false positive for a test result of a sample in a specimen container. A false positive is defined as an event where the detection system incorrectly identifies a test result as positive.

SUMMARY OF EMBODIMENTS OF THE INVENTION

Embodiments of the present invention are directed to automated systems, instruments and related methods that electronically select a suitable cell location among available open cells for loading a newly intaken specimen container to place the newly intaken specimen container at a location that can reduce a likelihood of a false positive test result for that sample in that specimen container and/or in one or more other specimen containers in occupied neighboring cells.

The newly intaken specimen container may be at a cooled temperature, at ambient temperature or pre-heated temperature at intake, but is typically (at intake) at a temperature less than an incubation chamber in the instrument that has a holding structure with a plurality of cells.

Embodiments of the invention are directed to methods for selecting an empty cell to place a specimen container in a test instrument. The methods include electronically determining and/or obtaining cell availability of cells of a holding structure in an incubated test chamber and for each a plurality of open and available cells: electronically identifying neighboring cells; electronically determining whether each of the identified neighboring cells are occupied or empty and, if occupied, electronically evaluating at least one of a test status or a time from load of a specimen container held therein.

The methods then include electronically selecting one of the plurality of open and available cells based at least in part on the electronically determining and electronically evaluating; and then electronically directing a loading mechanism to electromechanically load an incoming specimen container into the selected one of the open and available cells.

The electronically selecting can be carried out by electronically ranking at least some of the plurality of open and available cells based at least in part on whether the identified neighboring cells are occupied or empty and the at least one of test status or time from load of the occupied cells of the identified neighboring cells, and wherein the ranking is carried out using a cell criticality parameter defined for each of the neighboring cells of each of the plurality of open and available cells and mathematically summing the cell criticality parameter of each of the neighboring cells for each of the plurality of open and available cells to provide each open and available cell with a ranking number for the ranking.

The electronically selecting can include characterizing the identified neighboring cells for each one of the plurality of open and available cells as one of a plurality of different types and weighting directly adjacent ones of the neighboring cells with a first weight, weighting immediately adjacent cells in a row above and/or below with a second weight, and weighting +1 spaced apart neighboring cells with third weight, and optionally weighting more peripheral cells with a fourth weight, wherein the first weight is greater than the second and third weights and the optional fourth weight.

The method can further include electronically determining if a specimen container in a respective occupied cell of the neighboring cells is at a critical test phase, and, if so, assigning a cell criticality value that has an increased value relative to an empty cell for the ranking.

The holding structure can provide the cells as an array of rows and columns of cells, each having a unique X, Y address in a coordinate system. The method can further include identifying virtual/imaginary cell locations as empty cells of the neighboring cells for an empty and available cell residing adjacent an end of a row of cells. The selecting can be carried out using a cell criticality parameter defined for each of the neighboring cells of each of the plurality of open and available cells and mathematically summing the cell criticality parameter of each of the neighboring cells including the virtual cells for a respective open and empty cell residing at an end of a row of cells to provide each open and available cell with a ranking number for the selecting.

The selecting can be carried out by defining, for each of the plurality of open and available cells, a neighboring factor that comprises cell criticality values for each cell of the identified neighboring cells and summing the criticality values, then optionally applying defined weights to the summed criticality values. The criticality values can include at least a plurality of the following:

an End Factor: criticality value given to imaginary cells at the end of a row in a rack of rows and columns of the holding structure the rack, optionally −5;

an Initial Factor: criticality value given to newly loaded specimen container and/or very recently reloaded specimen containers, optionally −10;

a Positive Derivative Factor: criticality value given to a specimen container called positive due to slope between the last two sample readings ("Derivative"), optionally 50;

a Positive Non-Derivative Factor: criticality value given to a specimen container that is called positive due to reason other than Derivative, optionally 50.

a Count Factor: criticality value used when a specimen container in an occupied cell is in a critical test state and/or growth phase, optionally 25;

a Reload Factor: criticality value given to a reloaded specimen container, optionally 50;

a Residual Factor: criticality value given to a specimen container in an occupied cell with a high derivative value, but no other weight, optionally 25;

a Loaded Factor: criticality value given to a loaded specimen container in an occupied cell that has no other criticality, optionally 15; and a Gap Factor: criticality value used when a specimen container in an occupied cell has a data gap flag set corresponding to an open door condition, optionally 100.

The method can further include updating the cell availability upon unloading and/or loading of specimen containers into the cells of the holding structure to provide an updated inventory of a current plurality of open and available cells, then repeating the electronically evaluating of the at least one of a test status or a time from load of a specimen container held in respective occupied cells, and then repeating the selecting of the then open and available cells.

The method can include updating the cell availability periodically, optionally every 1-15 minutes, during an active loading period of the test instrument to provide an updated inventory of a current plurality of open and available cells, then repeating the electronically evaluating of the at least one of a test status or a time from load of a specimen container held in respective occupied cells, and then repeating the selecting of the then open and available cells.

The selecting can be carried out to identify empty cell locations for risk of inducing a false positive in specimen containers of occupied ones of the identified neighboring cells if loaded with the incoming specimen container.

The evaluating at least one of the test status or the time from load of respective specimen containers in occupied cells can include identifying whether the test status is in a critical test phase associated with a lower decision threshold range relative to earlier test phases.

The incoming specimen container can be at a temperature below a temperature of the incubated test chamber.

The incoming specimen container and specimen containers in the occupied cells can include an L.E.S. The electronically evaluating can evaluate reflectance data to identify the test status and determine if the specimen container in the occupied cell is at a critical test phase.

The selecting can identify and exclude at least one of the open and available cells has having an increased risk of causing a false positive relative to others of the open and available cells if loaded with the incoming specimen container at a time period of the selecting. The increased risk can correspond to a higher score of risk than other of the open and available cells having a lesser risk and a lower score of risk value.

The plurality of open and available cells can be all of the open and available cells in the holding structure. The holding structure can have an array of rows and columns of the cells. The test instrument can have at least one detector that is configured to obtain test data of the specimen containers in occupied cells.

Other embodiments are directed to methods for selecting an empty cell to place a specimen container in a test instrument. The methods include electronically determining and/or obtaining cell availability of cells of a holding structure in an incubated test chamber and for each of at least some of a plurality of open and available cells: electronically identifying neighboring cells; electronically determining whether each of the identified neighboring cells are occupied or empty and, if occupied, electronically evaluating at least one of a test status or a time from load of a specimen container held therein.

The methods can then include defining a cell criticality parameter for each of the neighboring cells of each of the plurality of open and available cells and mathematically summing the cell criticality parameter of each of the neighboring cells for each of the plurality of open and available cells to provide each open and available cell with a neighboring factor number; and then electronically directing a loading mechanism to electromechanically load an incoming specimen container into a selected one of the open and available cells based on the neighboring factor number.

Yet other embodiments are directed to test systems for evaluating samples. The test systems include a housing, an incubation chamber in the housing, a holding structure comprising a plurality of cells in a plurality of rows held in the incubation chamber, a loading mechanism in the housing configured to load specimen containers of respective samples into the cells of the holding structure, and at least one detector configured to detect test data of the specimen containers while held in the cells of the holding structure to determine whether a respective specimen container tests positive or negative. The test systems also include at least one processor coupled to the loading mechanism and configured to: obtain data of cell availability and/or determine cell availability of cells of the holding structure and, for each of at least some of open and available cells: identify defined neighboring cells; and determine whether each of the identified neighboring cells are occupied or empty. If occupied, the at least one processor can evaluate at least one of a test status or a time from load of a specimen container held therein; then calculate a neighboring factor number for each of the at least some of the plurality of open and available cells based at least in part on whether the identified neighboring cells are occupied or empty and the at least one of test status or time from load of the occupied cells of the identified neighboring cells; and then direct the loading mechanism to load an incoming specimen container into a selected one of the open and available cells based on the calculated neighboring factor number.

The at least one processor can be configured to sort and/or rank values of respective neighboring factor numbers using the calculated neighboring factor number of each of the at least some of the plurality of open cells to select one cell for the selected one for loading the incoming specimen container.

Still other aspects of the invention are directed to computer program products that include a non-transitory computer-readable medium with instructions stored thereon, that when executed by a processor, perform the steps of: determine and/or obtain cell availability of cells of a holding structure in an incubated test chamber; for each of a plurality of open and available cells: identify neighboring cells; determine whether each of the identified neighboring cells are occupied or empty, and if occupied, evaluate at least one of a test status or a time from load of a specimen container held therein.

The computer program products further include instructions stored thereon, that when executed by a processor, then perform the steps of: rank and/or sort each of the plurality of open and available cells based at least in part on whether the identified neighboring cells are occupied or empty and the at least one of test status or time from load of the occupied cells of the identified neighboring cells; and then direct a loading mechanism to electromechanically load an incoming specimen container into a selected one of the open and available cells based on the rank and/or sorted status.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 5A is a side elevation internal view of an example configuration of the system of FIG. 1.

FIG. 5B is a perspective view of the system shown in FIG. 5A, with the upper and lower doors open showing the interior chambers and racks of cells for holding multiple containers according to embodiments of the present invention.

DETAILED DESCRIPTION OF THE INVENTION

Figure 1:
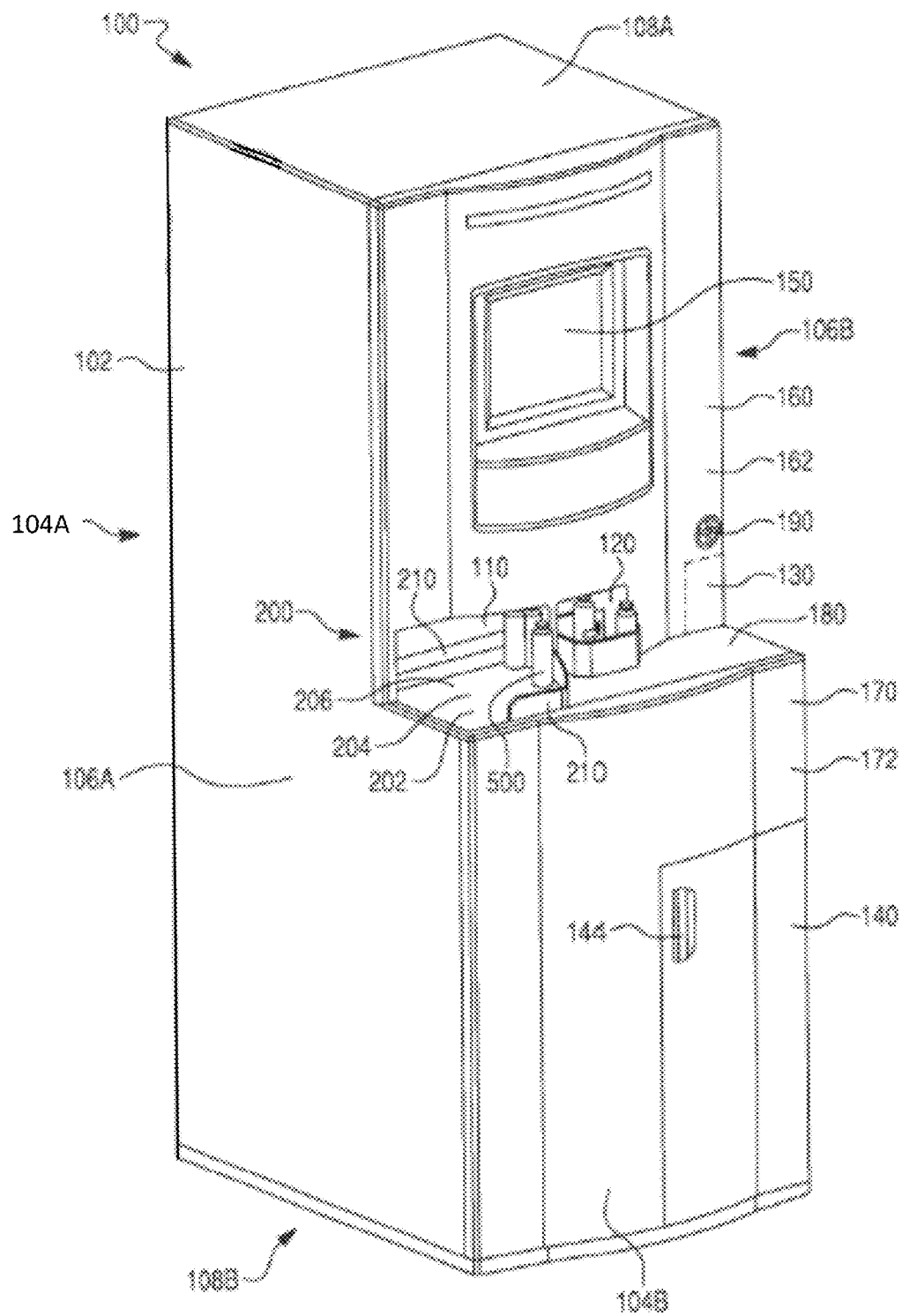
FIG. 1 is a side perspective view of an automated test system for non-invasive detection of a microbial agent in a test sample held in a specimen container.

The present invention will now be described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others. The terms "Fig." and "FIG." may be used interchangeably with the word "Figure" as abbreviations thereof in the specification and drawings.

In the drawings, the thickness of lines, layers, features, components and/or regions may be exaggerated for clarity. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. While the term "comprising" may be used herein, it should be understood that the objects referred to as "comprising" elements may also "consist of" or "consist essentially of" the elements. As used herein, the term "and/or" includes any and all combinations of one or more of the associated listed items. Like numbers refer to like elements throughout. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "automatically" means that the operation can be substantially, typically entirely, carried out without human or manual input, and is typically programmatically directed or carried out. The term "electronically" includes both wireless and wired connections between components. The term "about" means that the recited numerical value can vary by between +/−20%.

The terms "circuit" and "module" are used interchangeably and refer to an entirely software embodiment or an embodiment combining software and hardware aspects, features and/or components (including, for example, at least one processor and software associated therewith embedded therein and/or executable by and/or one or more Application Specific Integrated Circuits (ASICs), for programmatically directing and/or performing certain described actions or method steps). The circuit or module can reside in one location or multiple locations, it may be integrated into one component or may be distributed, e.g., the circuit or module may reside entirely in the test instrument, partially in the test instrument or communicate with the test instrument but reside totally in a remote location (i.e., server) away from the instrument such as in a Laboratory Information System (LIS) or in a cloud based server system.

Generally stated, automated systems/instruments and methods for non-invasive detection of the presence of a microbial agent (e.g., a microorganism) in a test sample contained within a specimen container, e.g., a culture bottle, are described herein. The systems and methods can select which of the empty cells to load a newly intaken specimen container to reduce a likelihood of inducing a false positive. Thus, the systems/methods can electronically exclude empty cells from being loaded with a newly intaken specimen container if those empty cells are identified as having an increased risk for causing a false positive in the newly intaken specimen container and/or to specimen containers in occupied cells.

One embodiment of the automated system or instrument is described herein in conjunction with FIGS. 1-3, 5A, 5B, 6 and 7. In order to better appreciate how the illustrated embodiment of the test system can operate, this specification may describe the automated test system in the context of a particular detection instrument (a blood culture instrument) and specimen container (a blood culture bottle). However, persons skilled in the art will readily appreciate that the test system can be practiced in other embodiments, that variations from the specific embodiments disclosed herein can be arrived at to suit particular implementations, and that therefore the present description is provided by way of illustration and not limitation.

Referring now to FIGS. 1-3, 5A and 5B, an automated test system 100 comprises a housing 102 and is configured with a holding structure 600 comprising a plurality of stacked cells 602 for holding specimen containers 500 for automated detection of a microbial agent (e.g., a microorganism) that may be present in a test sample or specimen sample held in a respective specimen container 500.

In general, any known test sample (e.g., a biological or even environmental sample) can be tested. For example, the test sample can be a clinical or non-clinical sample suspected of containing one or more microbial agents. Clinical samples, such as a bodily fluid, include, but are not limited to, blood, serum, plasma, blood fractions, joint fluid, urine, semen, saliva, feces, cerebrospinal fluid, gastric contents, vaginal secretions, tissue homogenates, bone marrow aspirates, bone homogenates, sputum, aspirates, swabs and swab rinsates, other body fluids, and the like. Non-clinical samples that may be tested include, but are not limited to, foodstuffs, beverages, pharmaceuticals, cosmetics, water (e.g., drinking water, non-potable water, and waste water), seawater ballasts, air, soil, sewage, plant material (e.g., seeds, leaves, stems, roots, flowers, fruit), blood products (e.g., platelets, serum, plasma, white blood cell fractions, etc.), donor organ or tissue samples, biowarfare samples, and the like. In one embodiment, the biological sample tested is a blood sample.

As shown, for example, in FIGS. 1-3 and 5A-5B, the automated test system 100 comprises an externally accessible container intake mechanism 200 (FIGS. 1-3) and one or more internal automated loader mechanisms 650 (FIG. 5A) or 700 (FIG. 6) for loading a specimen container 500 into a desired open cell of the holding structure 600. As shown, the housing 102 comprises back and front panels 104A and 104B, opposing side panels (e.g., left-side and right-side panels) 106A and 106B, a top or roof panel 108A and a bottom or floor panel 108B, which form an enclosure, enclosing an interior chamber 620 (see, e.g., FIGS. 5A-5B) of the detection system 100.

Figure 2:
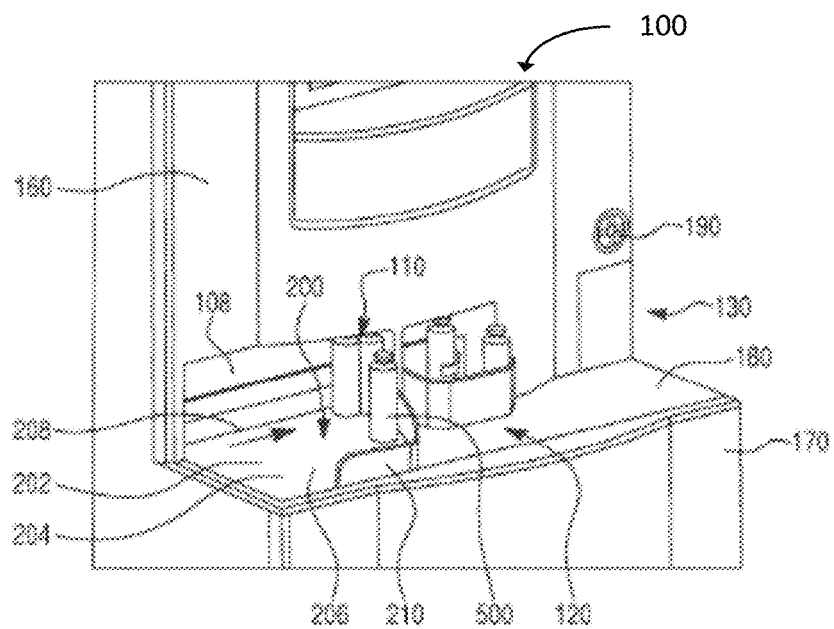
FIG. 2 is an enlarged partial perspective view of the test system of FIG. 1, showing a close-up view of the automated loading mechanism.
Figure 3:
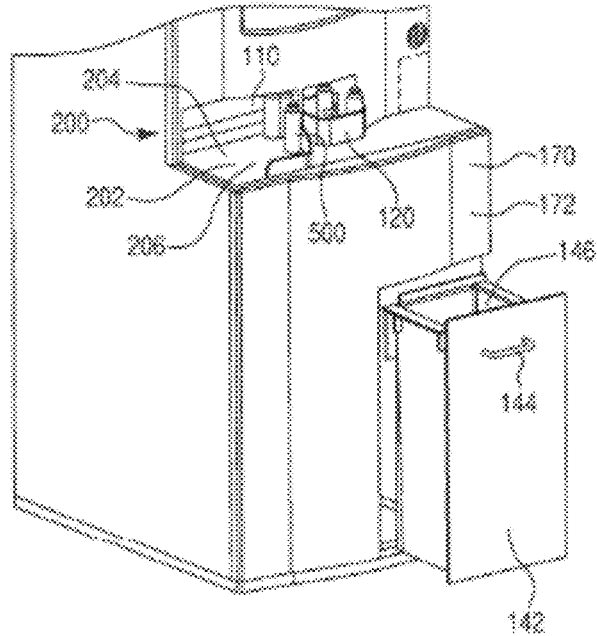
FIG. 3 is a partial perspective view of the test system of FIG. 1, which shows an automated loading mechanism and a lower drawer that opens to reveal a waste container for containers that tested negative for presence of a microbial agent.

In some embodiments, the interior chamber 620 is a climate-controlled chamber (e.g., a temperature-controlled incubation chamber wherein the temperature is maintained at about 37° Celsius ("C") to promote or enhance microbial growth. As shown in FIGS. 1-3, the housing 102 also may include a first port or container entrance location 110, a second port or misread/error location 120, a third port or positive container exit location 130, a lower access panel 140 (FIG. 1) or drawer 142 (FIG. 3), and/or a user interface display 150 (FIG. 1).

The lower access panel 140 or drawer 142 may include a handle 144. Also as shown in FIG. 1, the housing 102 may also comprise upper and lower sections 160 and 170, optionally each comprising an operable door (i.e., upper and lower doors) 162 and 172 (see, e.g., FIG. 5B). The upper door 162 and lower door 172 are operable to allow access to the interior chamber 620 of the detection system 100. However, as one of skill in the art would appreciate other design configurations are possible. For example, in another possible embodiment, the entire front panel 104B may comprise a single operable door (not shown).

As shown for example in FIGS. 1-3, the lower section 170 may have a larger profile or footprint than the upper section 160. In accordance with this embodiment the housing of the larger lower section 170 forms a shelf 180 on a top surface of the lower section 170 and adjacent to or in front of the upper section 160. This shelf 180 may provide a user workstation and/or workflow access points to the detection system 100. Furthermore, the shelf 180 may comprise an automated container intake mechanism 200 such as a conveyor. The shelf 180 may further provide access locations for the first port or container entrance location 110, the second port or misread/error location 120, and the third port or positive container exit location 130.

As shown for example in FIGS. 1-3 and 5A-5B, the automated intake mechanism 200 may comprise a container loading station or area 202, a transport mechanism 204 and a first port or container entrance location 110. In operation, a user or technician can place one or more specimen containers 500 (see, e.g., FIGS. 1 and 4) at the container loading station or area 202. A transport mechanism 204, for example, a conveyor belt 206, will transport the specimen container 500 to the first port or container entrance location 110, and in some designs subsequently through the entrance location 110 and into the test system 100, thereby intaking the container 500 into the test system 100. The sample in the container 500 at intake can be at a temperature that is less than the temperature in the interior chamber 620 and may be chilled, pre-heated or at an ambient temperature.

The test system 100 may also comprise an automated internal loader or loading mechanism 650 (FIGS. 5A, 5B) or 700 (FIG. 6) that is in the interior chamber 620 for moving the specimen containers 500 within the housing 102. For example, the internal loading mechanism 650 (FIG. 5A), 700 (FIG. 6) can transfer the specimen container 500 from an entrance location or port 110 (see, e.g., FIGS. 1-3), into the interior chamber 620 of the detection system 100, and place the container 500 into one of the cells 602 provided by the holding structure 600 which can include a plurality of stacked racks 600r. The transfer mechanism 650 (FIG. 5A) or 700 (FIG. 6) may also be used to rearrange, transfer or otherwise manage specimen containers 500 within the system. For example, in one embodiment, the transfer mechanism 650, 700 can be used to transfer a specimen container 500, detected as positive for microbial growth (referred to herein as a "positive" container), from the holding structure 600 to a positive container location, such as a positive container exit location or port 130 (see, e.g., FIG. 1) where a user or technician can easily remove the positive container 500 from the detection system 100. The transfer mechanism 650 (FIG. 5A) or 700 (FIG. 6) can also be used to transfer a container 500 determined as negative for microbial growth after a designated time has passed (referred to herein as a "negative" container), from the holding structure 600 to a negative container location within the system (e.g., a negative container waste bin 146 (see, e.g., FIG. 3)) where a user or technician can easily access the waste bin 146 for removal and disposal of the container 500. As one of skill in the art would appreciate, other designs may be employed for the automated transfer mechanism and are described elsewhere herein.

The test system 100 will also include a detection system 615 (FIG. 6) (which may be used interchangeably with the term "detector") for detecting growth in the specimen containers 500. In general, any known detection system in the art for detecting microbial growth in a container can be used. For example, the holding structure 600 can cooperate with one or more linear scanning optical systems 615o that is configured to non-invasively monitor microorganism growth in each or a sub-set of specimen containers 500 held in a respective cell 602 of a rack 600r. In some particular embodiments, the optical system 615 can monitor or interrogate a sensor (e.g., a Liquid Emulsion Sensor (LES) sensor) 514 (FIG. 4) in each of the specimen containers 500 to evaluate or detect for microorganism growth within the container 500.

The test system 100 can be configured to automatically unload "positive" and/or "negative" specimen containers 500 when testing is complete. This can operate to ensure that once a "positive" or "negative" reading has been made for each specimen container 500, the container 500 is removed from the cells 602 (see, e.g., FIGS. 5A and 5B), making room for another container 500 to be loaded into the test system 100.

Figure 4:
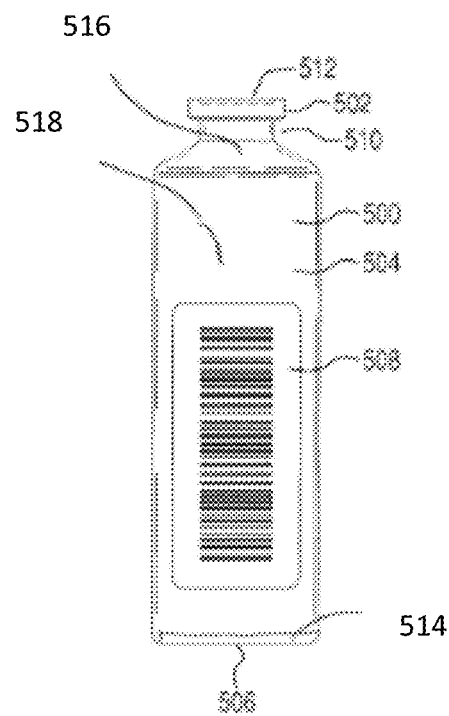
FIG. 4 is a side view of an example one of the specimen containers that can be processed in the test system of FIG. 1.

The specimen container 500, shown for example in FIG. 4, is shown in the form of a standard culture bottle (e.g., a blood culture bottle). However, this example specimen container is offered by way of example only and is not limiting to the present inventive concept. As shown in FIG. 4, the specimen container 500 comprises a top portion 502, a body 504, and a base 506. The container 500 may include a bar code label 508 for automated reading of the container 500 within either the test system or off-line equipment. As shown in FIG. 4, the top portion 502 of the container 500 typically comprises a narrow portion or neck 510 through which an opening 516 extends to provide communication with the interior chamber 518 of the container 500. As also shown, the container 500 also includes a closure device 512 (e.g., a stopper), optionally having a pierceable septum and may also have an internal sensor 514 (e.g., an LES sensor) formed or placed in the bottom of the container 500 for purposes of colorimetric detection of the presence of microbial growth in the container 500. However, the instant systems and methods can be adapted to a variety of specimen containers designed for culturing a test sample (e.g., a biological test sample).

The specimen containers 500 can comprise a test sample (e.g., a clinical or non-clinical biological sample) and can be loaded and unloaded into and out of the test system 100. The container 500 may further comprise a growth or culture medium (not shown) for promoting and/or enhancing microbial or microorganism growth. The use of a growth or culture media (or medium) for the cultivation of microorganisms is well known. A suitable growth or culture medium provides the proper nutritional and environmental conditions for growth of microorganisms and should contain all the nutrients required by the microorganism which is to be cultivated in the specimen container 500. After a sufficient time interval to allow natural amplification of microorganisms (this time interval varies from species to species), the container 500 can be tested within the test system 100 for the presence of microbial or microorganism growth. The testing may occur continuously or on a periodic basis so that the container 500 can be determined as positive for microorganism growth as soon as possible.

Once a container 500 in the system 100 is identified as positive, the system 100 can notify the operator through an indicator 190 (e.g., a visual prompt), and/or via a notification at the user interface display 150, or by other means.

As shown in FIGS. 1-3, 5A and 5B, and discussed above, the transport mechanism 204 can comprise a conveyor belt 206 operable to transport (e.g., convey) the containers 500 to an entrance location or port 110 and subsequently through the entrance location or port 110 and into the test system 100. However, other mechanisms for transporting the specimen containers 500 from an external loading station or area 202 to the entrance location or port 110 are envisioned, and may include, but are not limited to, feed screws, timing belts having grooves or molded plates, and the like. In other embodiments, the process of automated loading of a specimen container 500 into the test system 100 may further comprise transferring the container 500 into the test system 100 using a container locator device. See, e.g., FIGS. 27A-C, 28A-C, and 29 of U.S. Pat. No. 9,783,839, the contents of which are hereby incorporated by reference as if recited in full herein.

As shown in FIGS. 1-3, 5A and 5B, and discussed above, the loading station or area 202 and transport mechanism 204 can comprise a conveyor belt 206. In accordance with this embodiment, the user or technician can place one or more specimen containers 500 at a specific location or area (i.e., the loading station or area 202) of the conveyor belt 206 for automated loading of the containers 500 into the test system 100. The conveyor belt 206 may run continuously, or may be activated by the physical presence of the container 500 at the loading station or area 202. For example, a system controller can be used to operate the conveyor belt 206 (i.e., turn it on or off) based on a signal (e.g., a light sensor) indicating the presence, or absence, of one or more specimen containers at the loading station 202. Similarly, one or more sensors can be used at the entrance location or port 110 to indicate if a container is improperly loaded and/or has fallen over and may cause jamming. The conveyor belt 206 operates to move or transport the containers 500 from the loading station or area 202 (e.g., the left portion of the conveyor belt 206, as shown in FIG. 1) to the entrance location or port 110, thereby accumulating one or more containers 500 at the entrance location or port 110 to be loaded into the test system 100. Typically, as shown in FIGS. 1-3 and 5A-5B, the loading station or area 202, transport mechanism 204 or conveyor belt 206, and entrance location or port 110 are located outside, or on the housing 102 of the test system 100. In one embodiment, the automated loading mechanism 200 is located on a shelf 180 located on top of the lower section 170 and adjacent to the upper section 160 of the system 100. Also, as shown, the transport mechanism or conveyor belt 206 typically operates in a horizontal plane, so as to maintain the specimen containers 500 in a vertical or up-right orientation (i.e., such that the top portion 502 of the container 500 is up) for loading into the test system 100 (see, e.g., FIGS. 1-3 and 5A-5B). As shown in FIGS. 1-3, the transport mechanism or conveyor belt 206 moves, for example, from left-to-right, or from the loading station or area 202 towards the entrance location or port 110, to transport one or more free standing containers 500 (see, e.g., FIG. 2, arrow 208).

As shown, for example in FIGS. 1 and 2, the automated loading mechanism 200 can comprise one or more guide rails 210 located juxtaposed to one or both sides of the transport mechanism or conveyor belt 206. The one or more guide rails 210 function to guide or direct the specimen containers 500 to the entrance location or port 110 during operation of the transport mechanism or conveyor belt 206. The one or more guide rail(s) 210 can operate to funnel or guide the specimen containers 500 into a single file line at the back of the automated loading mechanism 200, where they await their turn to be loaded, one container at a time, into the test system 100.

The internal automated loading mechanism 650 (FIG. 5A) or 700 (FIG. 6) can transfer a specimen container 500 within the internal chamber 620. As already described, the entrance location or port 110 can receive containers 500 from, for example, a conveyor 206 shown in FIGS. 1-3. As the containers 500 accumulate in the entrance location or port 110, the containers 500 can be moved within the test system 100 whereby the internal loading mechanism 650 (FIG. 5A) or 700 (FIG. 6) can pick-up, or otherwise receive, an individual specimen container 500 and load that container into a selected cell 602 of the holding structure 600 within the test system 100, as described in more detail herein.

The loading mechanism 650, 700 may use a vision system (e.g., camera), pre-programmed dimensional coordinates correlated to cell locations with coordinate axis addresses, proximity sensors and/or precision motion control to load a respective specimen container 500 into a selected cell 602 of the holding structure 600.

The containers 500 can be serially placed or held in a respective cell of one of a plurality of racks 600r of the holding structure 600, and optionally agitated via a cooperating agitation assembly 626 (FIG. 7) to enhance microorganism growth therein.

Figure 6:
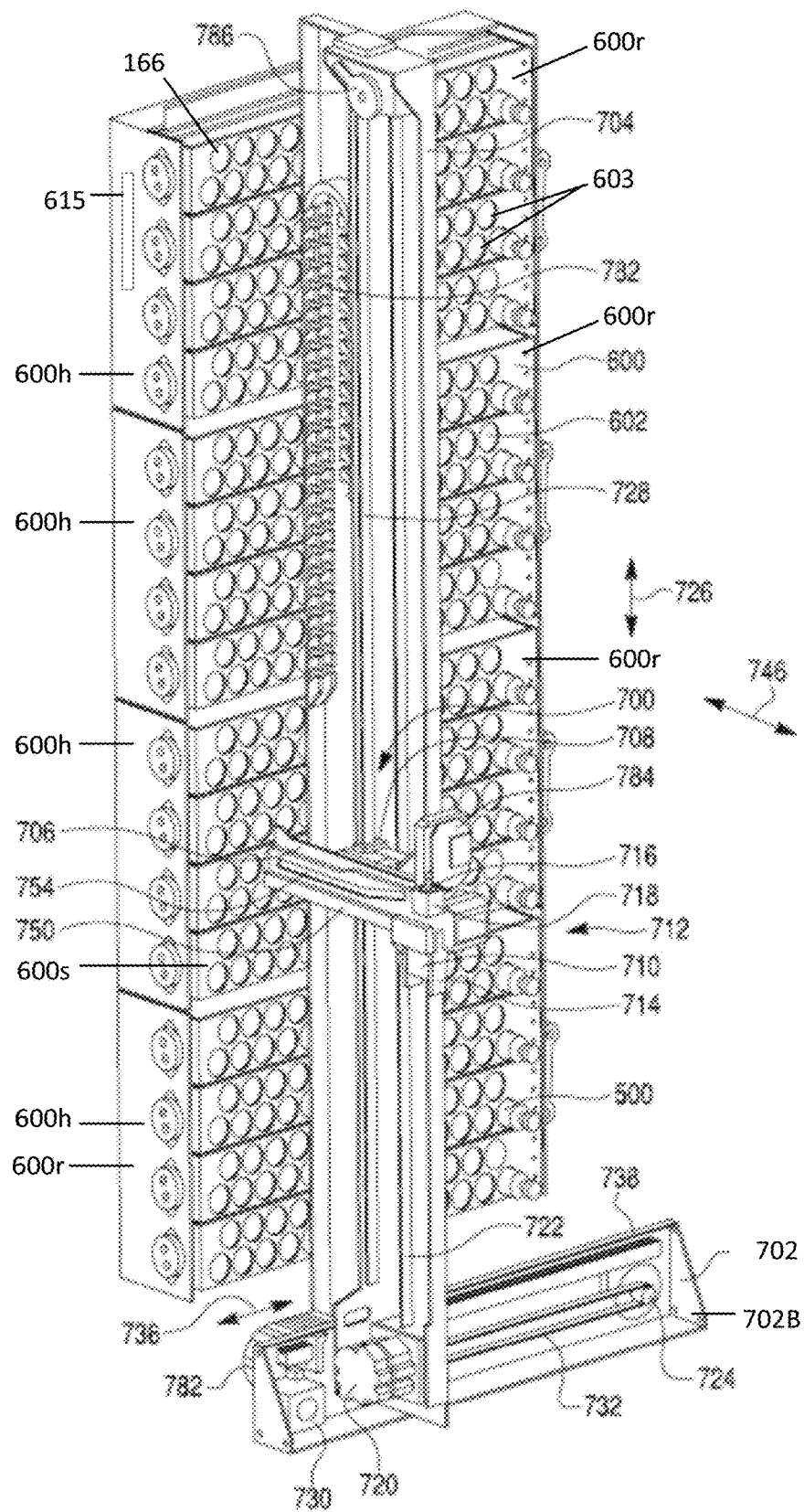
FIG. 6 is a perspective view of a holding structure providing racks of cells and an automated loading/transfer mechanism shown isolated from the test apparatus, according to embodiments of the present invention.
Figure 8:
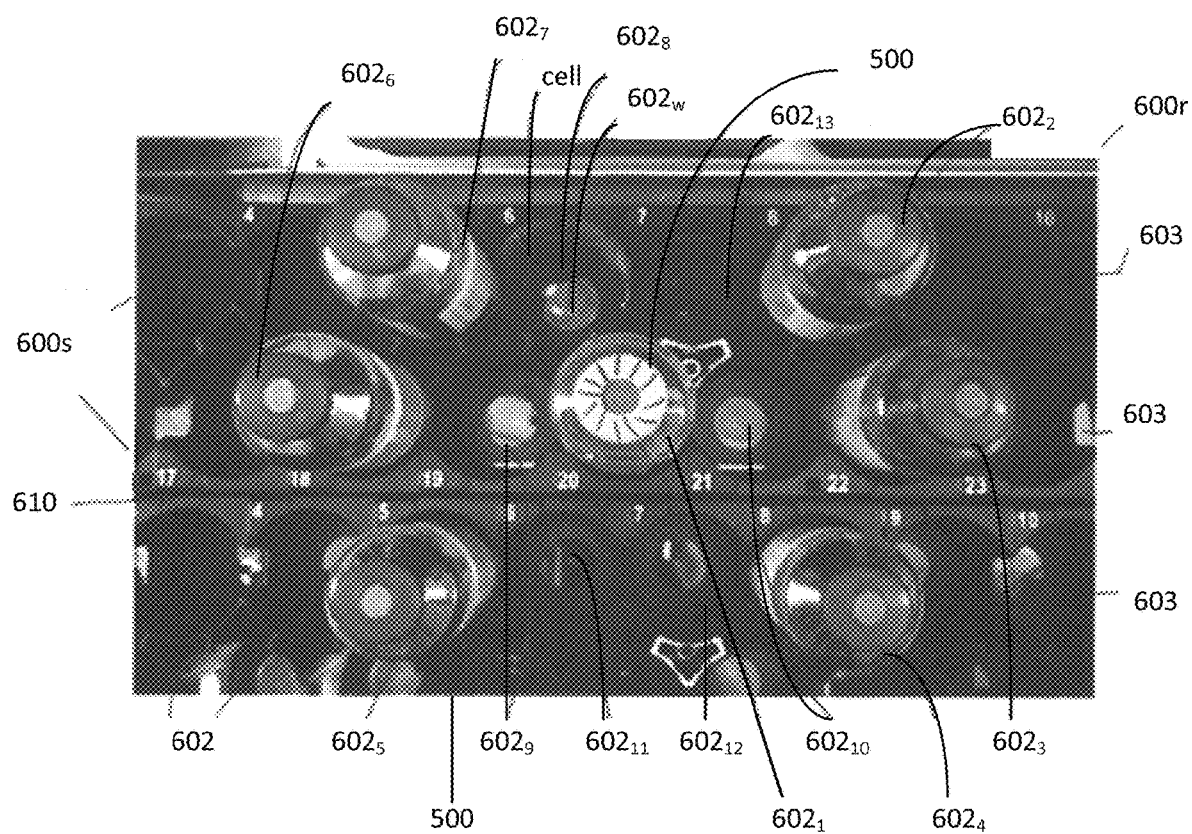
FIG. 8 is an enlarged front view of a portion of a rack of cells with exemplary selective cell loading of a specimen container according to embodiments of the present invention.

As shown for example in FIGS. 5A, 5B and 6, the holding structure 600 can comprise a plurality of stacked racks 600r with cells 602. The stacked racks 600r can comprise four racks stacked vertically as shown in FIG. 6. However, more or less numbers of such racks 600r can be used. Each rack 600r can comprise a plurality of stacked adjacent rows 603 of cells 602, shown as eight rows with centerlines of cells in adjacent rows, one above another, offset from each other in a lateral direction. The cells 602 can be orientated to hold the specimen containers 500 horizontally. The cells 602 can each have a window 602w (FIG. 8) that faces inward that allows visual access by the test system 615 (FIG. 6). Accordingly, the automated loading mechanism 650 (FIG. 5B) or 700 (FIG. 6) can rotate and/or re-orientate the container 500, from a vertical orientation at intake into the interior chamber 620 of the test system 100 to a horizontal orientation before placing it into the selected cell 602 with the lid 512 (FIG. 4) facing outward toward the front 104B (FIG. 1) of the test system 100 and the bottom 506 (FIG. 4) with the sensor 514 (FIG. 4) facing the inner facing window 602w (FIG. 8).

Figure 7:
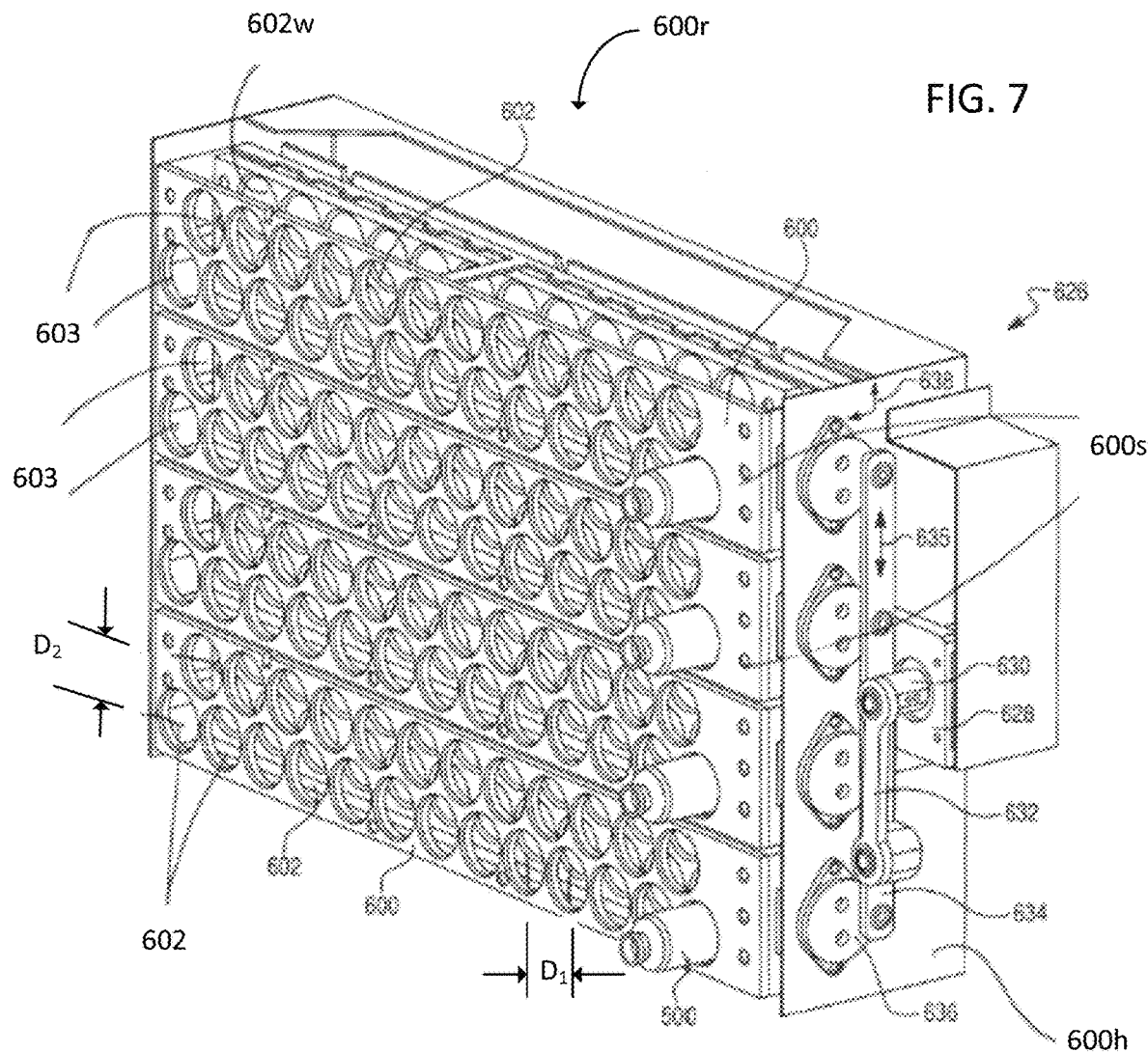
FIG. 7 is a perspective view of a portion of the holding structure with a cooperating agitation assembly shown isolated from the test system, according to embodiments of the present invention.

Referring to FIG. 7, adjacent cells 602 in a row 603 may have vertically extending centerlines that are laterally spaced apart a distance D1, that may be in a range of 1-2 inches in some embodiments. Cells 602 in adjacent neighboring rows 603 can have horizontally extending centerlines that are vertically spaced apart a distance D2, that may be in a range of 1-3 inches or in a range of 1-2 inches. D1<D2 in some embodiments.

In operation, the automated loading mechanism 650 (FIG. 5B), 700 (FIG. 6) can operate to select a cell location, transfer or otherwise move or relocate a specimen container 500 within the interior chamber 620 of the test system 100.

The loading mechanism 650 (FIG. 5B), 700 (FIG. 6) can operate to place the container 500 in one of a plurality of container receiving structures or cells 602 that are located in the holding structure 600. The loading mechanism can also operate to remove or unload "positive" and "negative" containers from the holding structures or racks 600. This automated unloading mechanism can operate to ensure that once a "positive" or "negative" reading has been made for each specimen container 500, the container 500 is removed from the container receiving structures or well 602, making room for another container to be loaded into the test system 100, thereby increasing system through-put.

The loading mechanism 650 (FIG. 5A), 700 (FIG. 6) can comprise a robotic transfer arm. In general, any type of robotic transfer arm can be used. For example, the robotic transfer arm can be a multi-axis robotic arm (for example, a 2-, 3-, 4-, 5-, or 6-axis robotic arm). The robotic transfer arm can operate to pick-up and transfer a specimen container 500 (e.g., a blood culture bottle) from an entrance location or port 110 to a selected one of a plurality of the cells 602 located in the holding structure 600. Furthermore, the interior chamber 620 of the test system 100 may include one or more supports for the loading mechanism 650, 700. For example, one or more vertical supports and/or one or more horizontal supports may be provided. The transfer mechanism or robotic transfer arm will slide up and down and across the supports as necessary to access any of the cells 602 of the holding structure 600.

Referring to FIGS. 5A and 5B, the loading mechanism 650 can comprise a robotic transfer arm that cooperates with an upper horizontal support rail 652A, a lower horizontal support rail 652B, a single vertical support rail 654 and a robotic head 656 that can include a gripping mechanism (not shown) for picking-up, gripping or otherwise holding a specimen container 500. As shown, the robotic head 656 is supported by, coupled to, and/or attached to the vertical support rail 654, which in turn is supported by the horizontal support rails 652A and 652B. In operation, the vertical support rail 654 can be moved along the horizontal support rails 652A and 652B, thereby moving the vertical support rail 654 and the robotic head 656 along a horizontal axis (e.g., the x-axis). In general, any known means in the art can be used to move the vertical support rail 654 along the horizontal support rails 652A and 652B. For further details of example components of the loading mechanism 650, see, e.g., U.S. Pat. Nos. 9,783,839 and 6,467,362, the contents of which are hereby incorporated by reference as if recited in full herein.

Referring to FIG. 6, the loading mechanism 700 can include one or more horizontal support structures 702, one or more vertical support structures 704, and a robotic head 710 that can include one or more features or devices (e.g., a gripping mechanism) to pick-up, grip and/or hold a specimen container 500. The robotic head 710 can be supported by, coupled to, and/or attached to one of the horizontal supports and/or vertical supports. For example, the robotic transfer arm 700 comprises a lower horizontal support structure 702B and a single vertical support structure 704. Although not shown, as one of skill in the art would appreciate an upper horizontal support structure (not shown), or other similar structure can be used to further support or guide the vertical support structure 704. The robotic head 710 can move up and down the vertical support rail 704 (as represented by arrow 726) and move the vertical support rail 704 back-and-forth along the horizontal support structure(s) 702B (as represented by arrow 736). For example, as shown in FIG. 6, the loading mechanism 700 can include a vertical drive motor 720 and vertical drive belt that will operate to transfer or move the robotic head 710 up and down (arrow 726) the vertical support rail 704 to transfer or move a container 500 along (i.e., up and down) a vertical axis (i.e., the y-axis). The vertical support structure 704 may further comprise a vertical guide rail 728 and a robotic head support block 708, as shown in FIG. 6. Accordingly, the vertical support structure 704, vertical guide rail 728, vertical drive motor 720 allow the robotic transfer arm 700 to move or transfer the robotic head support block 708, and thus, the robotic head 710 and a specimen container 500 along the y-axis.

Likewise, also as shown in FIG. 6, the robotic transfer arm 700 may further comprise a first horizontal drive motor 730, first horizontal drive belt 732 and horizontal guide rail 738 that will operate to move the vertical support structure 704 back-and-forth (i.e., from left-to-right and/or from right-to-left) along the horizontal guide rail 738, and thus, along a first horizontal axis (i.e., the x-axis) within the housing 102 of the detection system 100 (see arrow 736)). Accordingly, the horizontal support structure(s) 702B, first horizontal drive motor 730, first horizontal drive belt 732 and horizontal guide rail 738 allow the robotic transfer arm 700 to move or transfer a specimen container 500 along the x-axis. Applicant has found that a vertical support that is movable along a horizontal axis can allow for an increased capacity within the detection system, as the robotic transfer arm is movable over an increased area within the instrument.

Still referring to FIG. 6, the automated loading mechanism 700 may further comprise a linear or horizontal slide 706 and pivot plate 750. The linear or horizontal slide 706 can support the robotic head 710 and gripper mechanism 712. The linear or horizontal slide 706 and robotic head 710 may be supported by, coupled to, and/or attached to, a robotic head support block 708 and vertical guide rail 728 (previously described). In accordance with this embodiment, the linear or horizontal slide 706 can be moved up and down along a vertical axis (i.e., the y-axis), via the a robotic head support block 708 and vertical guide rail 728, to move or transfer the robotic head 710 and/or specimen container 500 up and down within the housing 102 of the detection system 100 (i.e., along the vertical axis (y-axis)). The linear or horizontal slide 706 may further comprises a pivot plate 750 comprising a pivot slot 754 that cooperates with a pivot slot cam follower operable to allow the robotic head 710 to slide or move along the linear or horizontal slide 706, from front-to-back or from back-to-front, to transfer or move a container 500 along a second horizontal axis (i.e., the z-axis). For additional description of example components of the loading mechanism 700, see, e.g., U.S. Pat. No. 9,783,839, the contents of which are hereby incorporated by reference as if recited in full herein.

The automated loading mechanism 650 (FIG. 5A), 700 (FIG. 6) can be placed under the control of a system controller 109 (FIGS. 11A, 11B) and programmed for specimen container 500 management (e.g., pick-up, transfer, selective loading placement and/or container removal) within the detection system 100.

The holding structure 600 of the test system 100 can take a variety of physical configurations for handling a plurality of individual specimen containers 500 so that a large number of containers, e.g., typically in a range of 200-800 containers, depending on the specific holding structures used, can be processed simultaneously. The holding structure 600 can be used for storage, agitation and/or incubation of the specimen containers 500.

Referring to FIGS. 5A-5B, 6 and 7, the holding structure 600 comprises a plurality of vertically stacked container racks 600r each having a plurality of horizontally aligned specimen container receiving cells 602 in a row 603 and each cell can be sized and configured to hold an individual specimen container 500. Two or more vertically stacked racks 600r can be used. For example, from about 2 to about 40, from about 2 to about 30, from about 2 to about 20, from about 2 to about 15 and from about 2 to about 4 vertically stacked holding structures or racks can be used.

Referring to FIGS. 6 and 7, each rack 600r can have a unit housing 600h that may have a common housing size with others of the racks 600r and may have the same number of adjacent rows 603 or different numbers of adjacent rows 603 of cells 602. As shown, there are four sub-units 600s within each unit housing 600h with two rows 603 of cells 602. Referring to FIG. 7, each rack 600r may have its own agitation assembly 626.

As shown in FIG. 8, each sub-unit 600s can have a defined number of cells that are serially numerically labeled with label 610, shown as labeled above in the upper row and labeled below a respective cell as numbers 1-23.

Referring to FIGS. 5A-5B the test system 100 includes a climate controlled interior chamber 620, comprising an upper interior chamber 622 and a lower interior chamber 624, and a plurality of vertically disposed holding structures or racks 600, typically between 2-15 vertically stacked racks 600r, each rack 600r having a plurality of individual container receiving structures or wells 602 therein.

Each individual rack 600r can comprise a plurality of adjacent rows 603 of cells 602. The number of adjacent rows 603 can be in a range of 2-20, more typically 4-10, shown as 8 in FIGS. 6 and 7. Each row 603 can have from about 2 to about 100 horizontally aligned cells, such as from about 10 to about 50, from about 10 to about 40, or from 10 to about 25 individual cells 602 therein. In some embodiments, the cells 602 in adjacent upper and lower neighboring rows 603 can be staggered, thus reducing the vertical height of each individual holding structure or rack 600 (see, e.g., FIG. 6) and thereby allowing for an increased number of total holding structures or racks 600r in a given vertical distance within the incubation chamber 620. As shown, for example in FIGS. 5A-5B, the detection system comprises 15 racks 600r each comprising two rows 603 of 10 individual cells 602 held in a unit housing 600h, thereby giving the system exemplified in FIGS. 5A-5B a total container capacity of 300. More or less racks 600r can be used and more or less cells 602 can be provided.

Furthermore, each of the individual cells 602 has a specific coordinate position and/or address for container management, typically X is the horizontal location and Y is the vertical location of each container cell 602.

Referring to FIG. 7, a rack 600r can be agitated by an agitation assembly 626 to promote or enhance microorganism growth. The agitation assembly 626 can be any known means or mechanism for providing agitation (e.g., vibration and/or a rocking motion) to the holding structure 600, sub-units 600s and/or racks 600r. In some particular embodiments, the racks 600r can be rocked in a back-and-forth motion for agitation of the fluid contained within the containers 500. As shown in FIG. 7, the agitation assembly 626 cooperates with one or more racks 600r comprising a plurality of holding wells 602 for holding a plurality of specimen containers 500. The agitation assembly 626 can comprise an agitation motor 628, an eccentric coupling 630, a first rotation arm 632, a second rotation arm or linkage arm 634 and a rack agitation bearing assembly 636. In operation, the agitation motor 628 rotates the eccentric coupling 630 in an off-center motion thereby moving a first rotation arm 632 in an off-center circular or off-center rotational motion. The off-center rotational movement of the first rotation arm 632 moves a second rotation arm or linkage arm 634 in a linear motion (as represented by arrow 635). The linear motion of the second rotation arm or linkage arm 634 rocks the rack agitation bearing assembly 636 in a back-and-forth rocking motion, thereby providing a back-and-forth rocking agitation motion (represented by arrow 638 of FIG. 7) to the rack 600r.

Referring to FIG. 8, each cell 602 can have a plurality of neighboring cells 602n. Using cell $602_1$ as an example, the neighboring cells 602n can include twelve neighboring cells $602_2$-$602_{13}$. However, if the cell 602 is on an end of a row or end portion of a row, there may be lesser neighboring cells for that cell.

Also, what is considered a neighboring cell 602n for selecting an empty cell for loading can vary depending on spacing of cells and size of specimen containers, for example. However, it is contemplated that the number "n" of neighboring cells 602n used for selecting an appropriate cell for a newly intaken specimen container will include immediately adjacent neighboring cells in the same row and can include more peripheral cells. Thus, the number of neighboring cells 602n for an empty cell being evaluated for potential loading as will be discussed further below can be in a range of 2-24, more typically in a range of 2-12, including a range of 4-12.

Thus, referring to FIG. 8, in this example, cell 20 labeled as cell $602_1$ is occupied as are neighboring cells 5 and 8 ($602_7$, $602_2$) in the row 603 above cell 20, cells 18 and 22 ($602_6$, $602_3$) in the same row as cell 20, and cells 5 and 8 ($602_5$, $602_4$) in the row below cell 20. Cell 18 ($602_6$) and cell 22 ($602_3$) are spaced apart +1 from cell 20 in the same row. The immediately adjacent or neighboring cells 19 and 21 ($602_9$, $602_{10}$) are unoccupied as are cells 6 and 7 above ($602_8$, $602_{13}$) and below ($602_{11}$, $602_{12}$) the row 603 that holds the occupied cell $602_1$. Other more peripheral cells are also unoccupied, i.e., cells 4, 9 and 10 above and below the row with occupied cell 20 and cells 17 and 23 in the same row as occupied cell 20. These more peripheral cells may not be considered as "neighboring" cells to cell 20 (if empty) when evaluating cell 20 as a respective empty cell to identify where to load a newly intaken specimen container as will be discussed further below. Typically, at least immediately adjacent cells in the same row as a respective empty cell 602 are considered neighboring cells. In some embodiments, the +1 cells 602 in the same row 603 and on either side of an empty cell 602 are also included as neighboring cells. Also, at least first and second cells 602 immediately above and below the open empty cell (i.e., cells 6, 7 in the example shown if cell 20 is the "empty" cell considered for loading) can also be considered neighboring cells. However, any adjacent row in a different rack 600r may be excluded as having any neighboring cells as the housing 600h or spacing of the rack units may provide sufficient thermal isolation.

As discussed above, the present inventive concept can electronically evaluate cells to identify which empty cell to load a newly intaken specimen container to reduce a likelihood of inducing a false positive test in the newly intaken specimen container and/or to specimen containers in already occupied cells.

The test system 100 can include or communicate with at least one processor 109/350 (FIGS. 11A, 11B, 12) that electronically identifies open cells for cell availability and electronically evaluates which of a plurality of different open cells to load with a newly intaken specimen container by considering empty or occupied content of its neighboring cells and a test status of any specimen container in a neighboring occupied cell. The test system 100 can ascertain whether a respective empty cell is more or less likely than other empty cells to put one or more tests of samples in specimen containers in occupied neighboring cells at risk of being identified with a false positive. The false positive can be induced by placing one or more newly intaken specimen containers (which are at a different temperature than in-test specimen containers) next to specimen containers in occupied neighboring cells during a critical test phase which can potentially cause undesired temperature fluctuation and influence sensor readings for the newly intaken specimen container or in in-test specimen containers.

The test system 100 can electronically evaluate some or all of the inventory of available empty cells with respect to status of neighboring cells and select an available empty cell 602 with a lowest or lower risk than other empty cells 602, then direct the loading mechanism 650, 700 to place the newly intaken specimen container 500 in the selected open cell with the least or lesser risk. The selective cell loading analysis can evaluate what test phase a specimen container 500 in the occupied cells of the neighboring cells 602n is in at a time of loading of the newly intaken container and can also consider whether there are other open cells in the neighboring cells 602n.

The test system 100 can calculate a neighboring factor and rank open and available cells 602 using the neighboring factor to assign lesser and higher risk values associated with a risk inducing a false positive if a particular empty cell is used for a newly intaken specimen container. The open cell 602 with the neighboring factor providing a least risk or a lower risk than other empty cells 602 can be selected.

Alternatively, instead of ranking all or some of the available and open cells, the selection can select one of the cells deemed to be of lesser risk than cells of greater risk based on the neighboring factor assessment. Thus, those cells deemed to be of higher risk such as above a median value of lesser risk cells are not selectable at the instant time of evaluation for intake of the newly incoming specimen bottle. Thus, while a ranking of relative risk is helpful it is not required for selection of lesser risk cells for loading the newly intaken specimen container.

As used herein, "cell availability" means the number of open unoccupied cells 602 in the holding structure 600 that are available for receiving a specimen container. Cells 602 in the holding structure 600 may already hold a specimen container 500 in them (i.e., "occupied"), may be malfunctioning, or may not be eligible for receiving a specimen container for another reason, in which case these cells are not considered available for loading with newly intaken specimen containers. The term "newly intaken" specimen container can be used interchangeably with "incoming" specimen container and refers to a specimen container being provided to the test instrument for analysis. The newly intaken or incoming specimen container can be held outside the test instrument or in a loading chamber inside the test instrument or even held by the loading mechanism 650, 700 ready for loading into a selected cell, once identified. As discussed above, a respective newly intaken specimen container 500 is typically at a lower temperature than the interior (incubation) chamber 620. The "newly intaken" or "incoming" specimen container can be an untested specimen container or a re-test specimen container (i.e., the latter referring to a specimen container with a sample that may have had a prior incomplete or false test result).

Figure 11A:
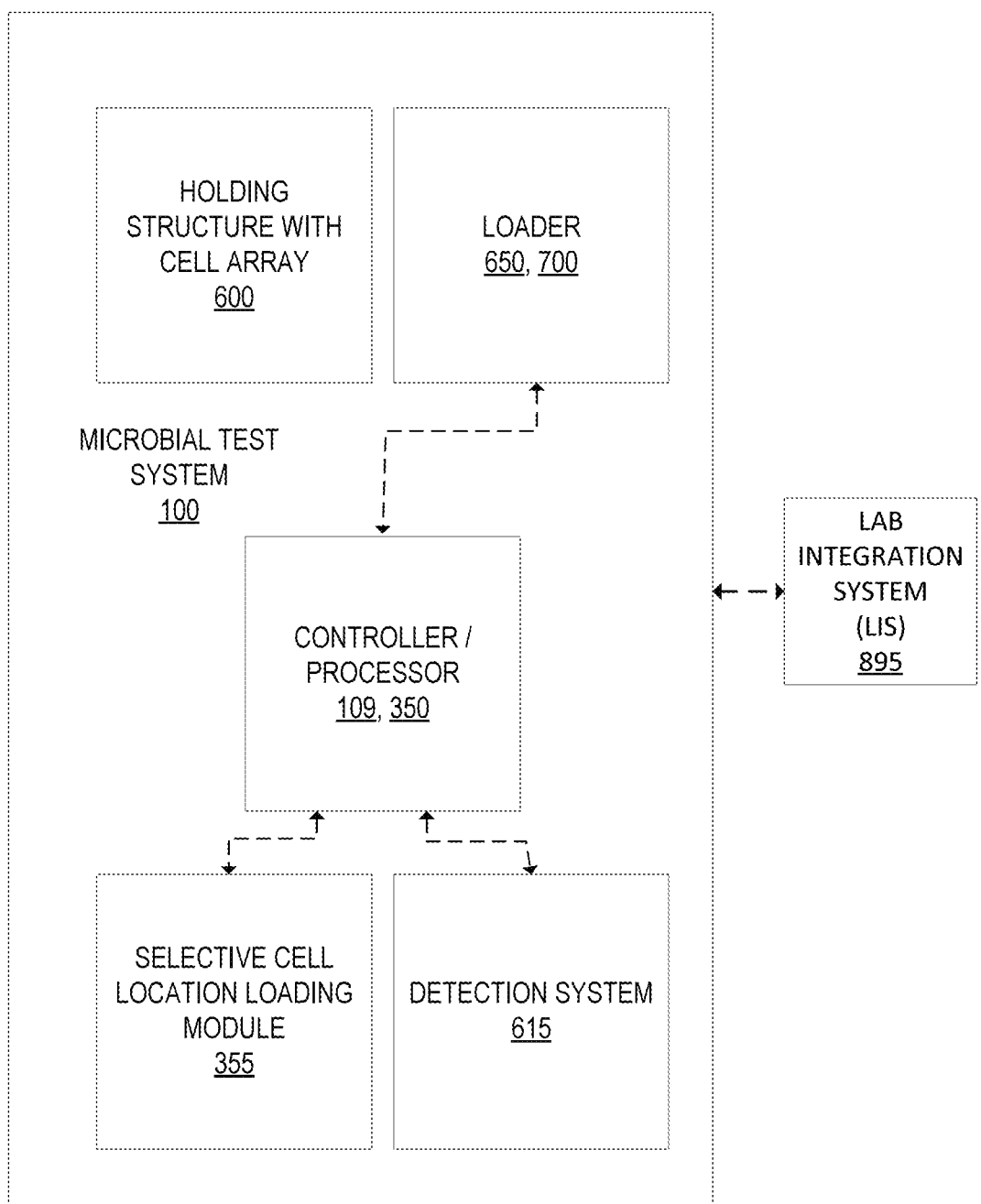
FIG. 11A is a block diagram of an example test system according to embodiments of the present invention.
Figure 11B:
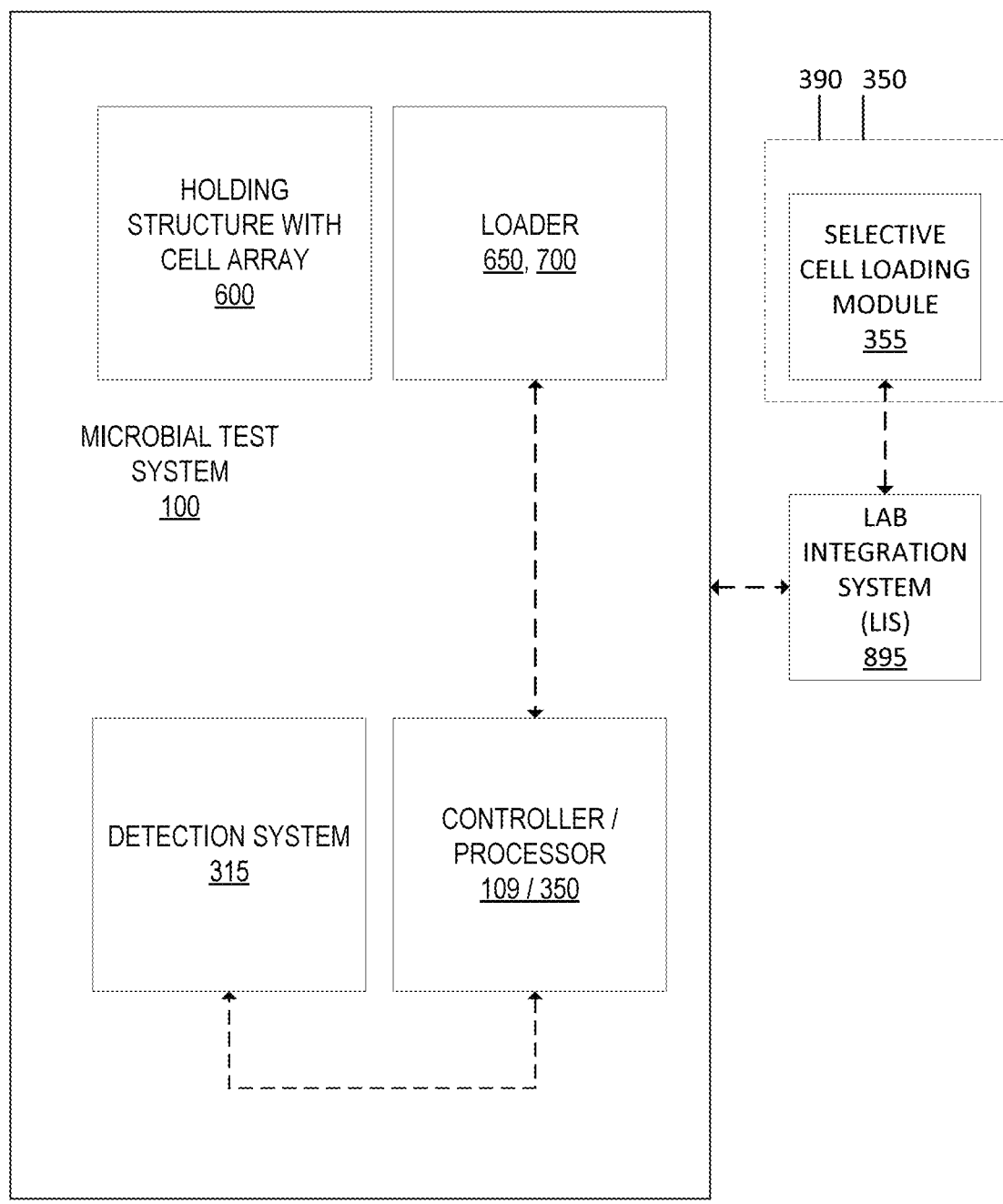
FIG. 11B is another block diagram of an example test system according to embodiments of the present invention.

The test instrument 100 and/or selective loading module 355 can identify the cell availability in a number of ways. For example, one or more cameras 165 (FIG. 5B) optionally positioned on an inside of the front door or doors 162, 172 or otherwise held in the interior chamber 620 to be in visual communication with the cells 602 to obtain images used to identify which cells are occupied and which are empty and update the cell status using images obtained continuously or periodically or triggered by events such as a container being loaded and a container being unloaded. Alternatively or additionally, sensors 166 (FIG. 6) such as proximity sensors, pressure sensors, optical sensors, hall-effect sensors and the like, can be coupled to each cell 602 and also coupled to a processor such as the system controller 109/350 (FIGS. 11A, 11B). The sensors 166 can provide data that the system controller 109/350 can monitor to identify a respective cell status of the cells 602 as "empty" or "occupied".

Figure 9:
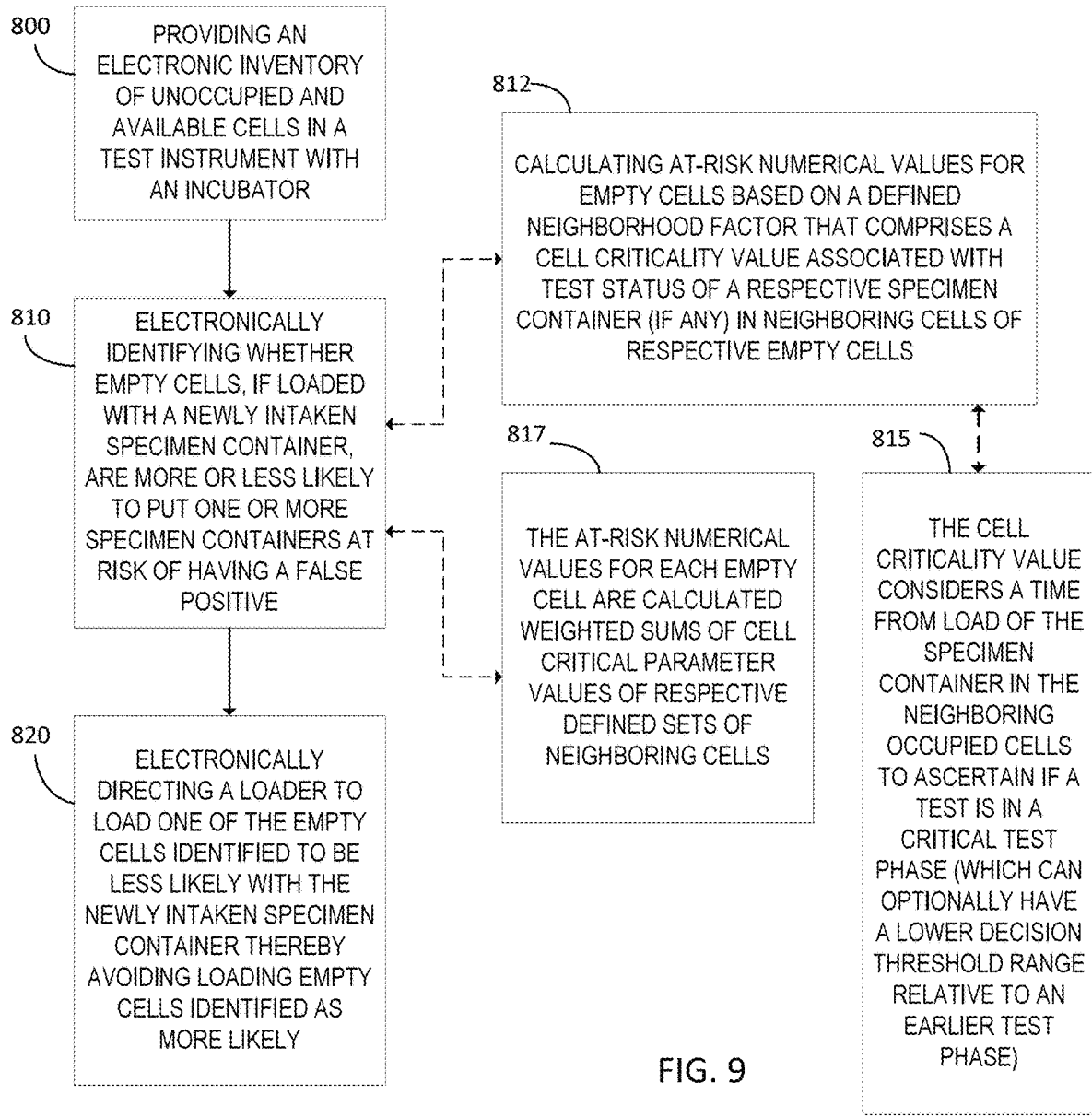
FIG. 9 is a flow chart showing example actions that can be performed in the operation of a test system according to embodiments of the present invention.

FIG. 9 illustrates exemplary actions or operations that can be used to carry out embodiments of the invention. An electronic inventory of cell availability of unoccupied cells in a test instrument with an incubator is provided and/or obtained (block 800). Empty cells are electronically identified and evaluated to determine whether a respective empty cell, if loaded with a newly intaken specimen container, is more or less likely to put one or more specimen containers at risk of having a false positive (block 810). An automated loader can be electronically directed to load one of the empty cells identified to be less likely with the newly intaken specimen container thereby avoiding loading empty cells identified as more likely (block 820).

At-risk numerical values for empty cells can be calculated based on a defined neighboring factor that comprises a cell criticality value associated with test status of a respective specimen container (if any) in neighboring cells of respective empty cells (block 812).

The at-risk numerical values for each empty cell can be calculated as weighted sums of cell critical parameter values of respective defined sets of neighboring cells (block 817).

The cell criticality value can consider a time from load of each of the specimen containers in the neighboring occupied cells to ascertain if a respective test is in a critical test phase (which can optionally have a lower decision reflectance threshold range relative to an earlier test phase)(block 815).

A number of criteria can be taken into consideration to determine the risk level that each vacant cell has on the current bottles under test. Each of these criteria can be given a weight to differentiate which criteria have the greatest impact on false positives. The weights assigned to each criteria can be modified. The weights on the criteria can be referred to as adjustable parameters that may be tuned to tailor a loading selection process for the environment, sensor and detector type and conditions that a particular test instrument is used in.

Embodiments of the invention use methodology to predict where the worst cell location to load a bottle is, and then try to avoid that place. To determine if one empty cell is worse than another for loading with a specimen container 500, a plurality of variables, such as 3-4 variables, can be evaluated and weights assigned to those variables.

Neighboring cells can be characterized into different categories and each category can have a different weight. For example, the neighboring cells can include three different categories: immediately adjacent (on either side of the empty or vacant cell), opposite row (two closest cells in another adjacent row, above or below the row with the vacant cell) and cells spaced further away from directly adjacent cells (i.e., on either side, but +1 cell away and optionally also +2 cells). All neighboring cells 602n can be in the same rack 600r or in a single sub-unit 600s (FIG. 6, 7). The immediately adjacent cells can have a weight that is greater than the weights of the other two categories of neighboring cells.

For example, a first category can have an Adjacent Weight: Weight given to the cells immediately adjacent to a given cell in the same row of the same rack. A second category can be an Opposite Weight: Weight given to the cells diagonally adjacent to a given cell in the opposite row of the same rack or sub-unit. A third category can be a Further Weight: Weight given to the cells two cells away from a given cell in the same row of the same rack. The Adjacent Weight>The Opposite Weight>The Further Weight. The Adjacent Weight can be 1. The Opposite Weight can be 0.7 and the Further Weight can be 0.3. However, other weights can be used.

The BACT/ALERT® VIRTUO® blood culture test instrument uses a colorimetric optical system for detecting the positivity of a blood culture test and the colorimetric optical system is composed of multi-color LEDs and a photodiode, which are susceptible to variation based on environmental temperature fluctuations. The present invention provides a "smart" loading process to avoid loading at-risk vacant cells to reduce the temperature variation on the colorimetric optical system. However, the "smart" loading process can also be implemented on any system that utilizes a sensing method that is sensitive to temperature fluctuation. Other blood culture instruments use fluorescent based sensing systems, instead of colorimetric, which can also be impacted by changes in environmental temperature. These systems would also show changes in sensor readings based on the introduction of a sample at different temperatures, and could be mitigated by predicting the effects of that new sample in vacant locations. For example, some test systems employ infrared (IR) and fluorescent indicators to determine when specimen containers are positive. Temperature fluctuations can cause fluorescent material to change excitation states, which in turn gives off a fluorescent signal. Therefore, a system using IR & fluorescent signals may benefit from a "smart" loading selection process according to embodiments of the present invention.

The smart loading system can electronically review open and available cells according to defined criteria including a cell criticality factor based on status of an open cell's neighbor cells and rank and/or sort those open cells as cells to avoid and/or preferred cells for loading. The sorting can be based on a threshold value of "bad" or "good" locations or a relative value of "good" or "bad" associated with those cells that are open and available.

Figure 10:
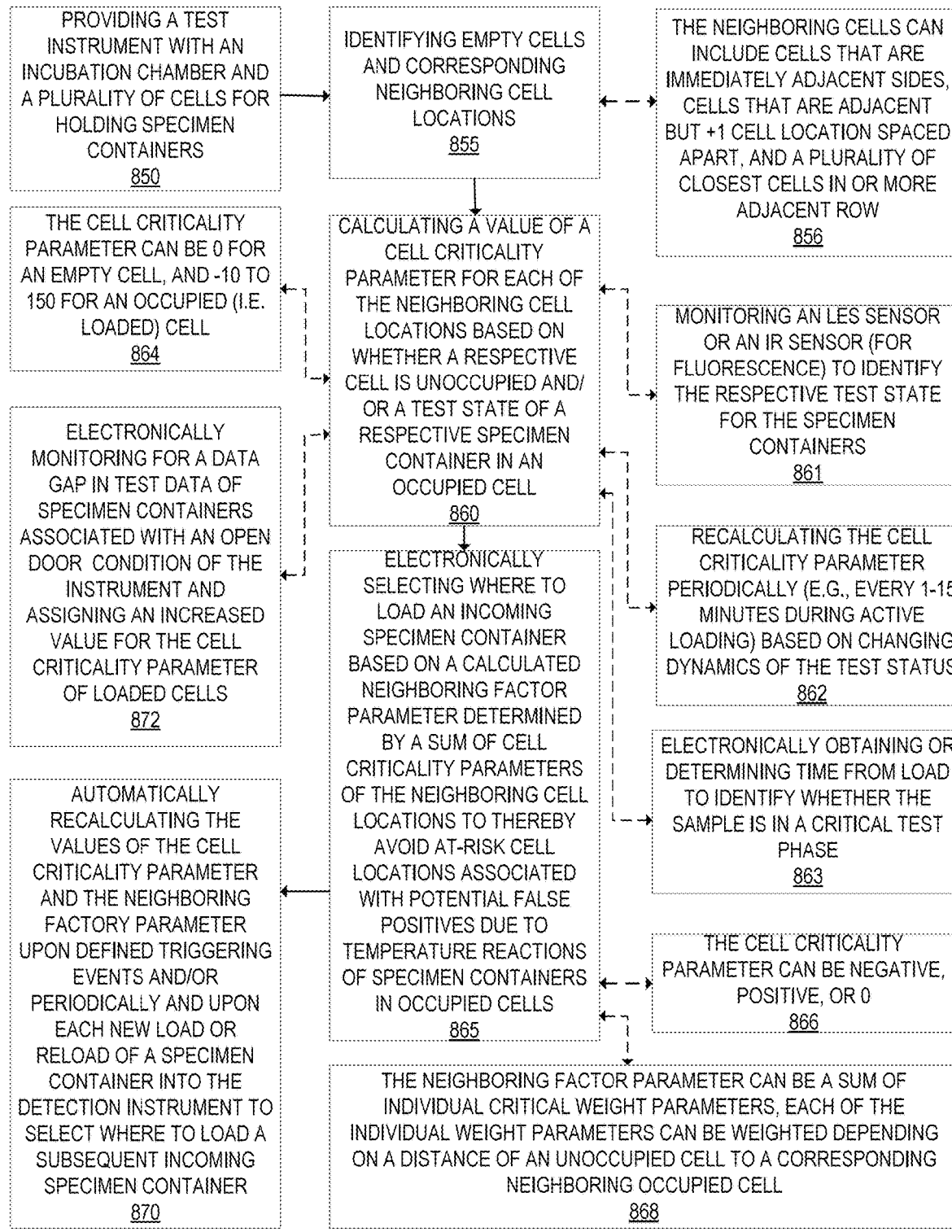
FIG. 10 is another flow chart showing example actions that can be performed in the operation of a test system according to embodiments of the present invention.

FIG. 10 illustrates exemplary actions or operations that can be used to carry out embodiments of the invention. A test instrument with an incubation chamber and a plurality of cells for holding specimen containers is provided (block 850). Empty cells and corresponding neighboring cell locations are identified (block 855). A value of a cell criticality parameter for each of the neighboring cell locations is calculated based on whether a respective cell is unoccupied and/or a test state of a respective specimen container in an occupied cell (block 860). Where to load an incoming specimen container is electronically selected based on a calculated neighboring factor parameter determined by a sum of cell criticality parameters of the neighboring cell locations to thereby avoid at-risk cell locations associated with potential false positives due to temperature induced reactions of sensors of the specimen containers (block 865). The values of the cell criticality parameter can be automatically recalculated along with a corresponding neighboring factory parameter upon defined triggering events and/or periodically and upon each new load or reload of a specimen container into the detection instrument to select where to load a subsequent incoming specimen container (block 870).

The defined triggering events can include a new load, an unload, a remove and replace indexer cover, an open door, a reboot start and a reboot end, particularly if a triggering event happens during a critical test phase.

The term "critical test phase" refers to that part of a sample test cycle where microbial growth is more sensitive to a temperature fluctuation and/or where decision threshold limits for "positive" and "negative" test characterizations are reduced relative to other test phases. The critical test phase is typically at a time that is greater than 5 hours from initial load of a new and untested specimen container into the test instrument.

The term "neighboring" cells with respect to an empty or vacant cell analyzed for cell criticality can refer to: (a) cells that are only on immediately adjacent sides of an empty or vacant cell; (b) cells that are on immediately adjacent sides and immediately above and/or below the vacant or empty cell; (c) cells that are immediately adjacent and cells that have a +1 cell spacing; or (d) cells that are immediately adjacent and cells with a +1 spacing side to side and one or more closest cells in one or more adjacent row that is above or below the open cell being analyzed for selection (block 856).

A sensor such as an LES sensor or an IR sensor (for fluorescence) can be monitored to identify the respective test state for the specimen containers (block 861).

The cell criticality parameter can be periodically recalculated (i.e., every 1-15 minutes during active loading) and/or upon each successive new load based on changing dynamics of the test status (block 862).

A time from load for each neighboring specimen container of an empty cell can be electronically determined or obtained and used to identify whether the sample is in a critical test phase (block 863) and this time can optionally be used to either or both increase the cell criticality value if the sample is identified in the critical test phase or exclude that empty cell from being loaded with the newly intaken specimen container. Thus, the cell criticality parameter can optionally consider the time from load of the specimen container in the neighboring occupied cells to ascertain if the test is in a critical test phase, as this test phase can have a lower reflectance decision threshold range relative to an earlier test phase(s).

The cell criticality parameter can be negative, positive or 0 (block 866).

The neighboring factor parameter can be a sum of individual critical weight parameters and each of the individual weight parameters can be weighted depending on a distance of an unoccupied cell for potential selection to load the newly intaken specimen container to a corresponding neighboring occupied cell (block 868).

The cell criticality parameter can be 0 for an empty cell, and −10 to 150 for an occupied (i.e., loaded) cell in the neighboring cells (block 864).

A data gap in test data of samples in specimen containers associated with an open door condition of the instrument can be electronically monitored and a value for the cell criticality parameter of loaded cells can be increased relative to a default cell criticality value absent the open door condition (block 872).

The containers can optionally comprise blood samples, including cultured samples or whole blood samples.

FIG. 11A illustrates that the test system 100 can include a holding structure comprising a cell array 600, a loader 650, 700, a detection system 615 and an onboard selective cell loading module 355 that can be in communication with or totally or partially onboard the system controller and/or processor 109/350. The test system 100 can be in communication with an LIS 895.

FIG. 11B illustrates that the test system 100 can communicate with a remotely located selective cell loading module 355, at least one processor 350 which may reside in one or more servers 390 and/or an LIS 895.

The test system 100 can be included as one component of an automated laboratory system. The test system 100 can be coupled to, "daisy chained" or otherwise linked to one or more other systems or modules, for example, identification testing systems such as the VITEK or VIDAS systems of the assignee bioMérieux, Inc., a gram stainer, a mass spectrometry unit, a molecular diagnostic test system, a plate streaker, an automated characterization and/or identification system (as disclosed in U.S. patent application No. 60/216,339, entitled "System for Rapid Non-invasive Detection of a Microbial Agent in a Biological Sample and Identifying and/or Characterizing the Microbial Agent", which was filed May 15, 2009) or other analytical systems. The content of the noted patent application is hereby incorporated by reference as if recited in full herein.

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowcharts and block diagrams of certain of the figures herein illustrate exemplary architecture, functionality, and operation of possible implementations of embodiments of the present invention. It should be noted that in some alternative implementations, the steps noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

As discussed above, embodiments of the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one computer (e.g., a test instrument computer and/or processor), partly on one computer, as a stand-alone software package, partly on the test instrument/system computer and partly on another computer, local and/or remote or entirely on the other local or remote computer. In the latter scenario, the other local or remote computer may be connected to the test instrument/system 100 computer and/or processor through a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

Figure 12:
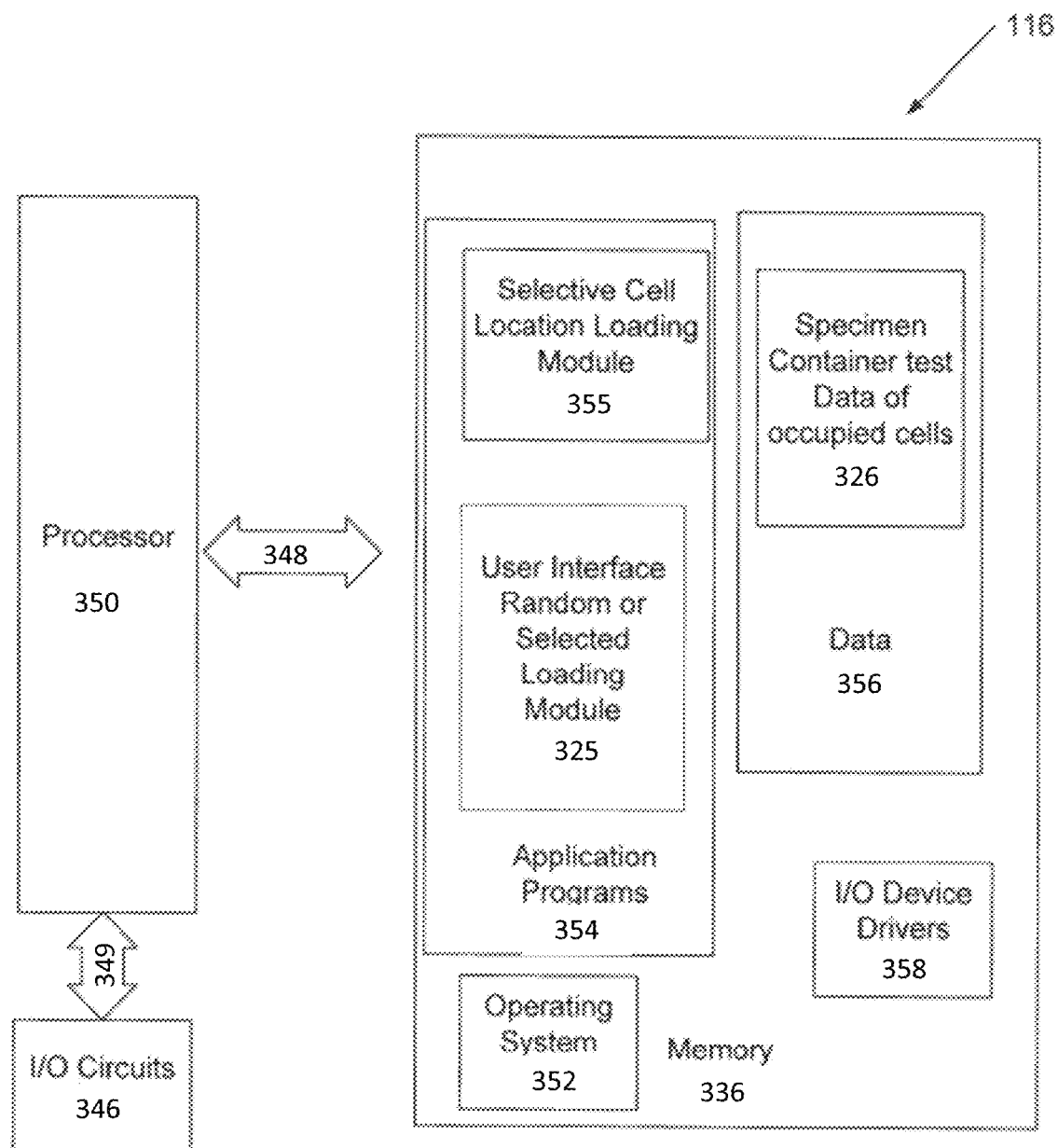
FIG. 12 is a schematic illustration of a data processing system according to embodiments of the present invention.

As illustrated in FIG. 12, embodiments of the invention may be configured as a data processing system 116, which can be used to carry out or direct operations of the test instrument/system 100, and can include a processor circuit 350, a memory 336 and input/output circuits 346. The data processing system may be incorporated in, for example, one or more of a computer, server, router or the like. The system 116 can reside on one machine, such as in the controller 109 (FIG. 11A) or be distributed over a plurality of machines.

The processor 350 can communicate with the memory 336 via an address/data bus 348 and communicate with the input/output circuits 346 via an address/data bus 349. The input/output circuits 346 can be used to transfer information between the memory (memory and/or storage media) 336 and another computer system or a network using, for example, an Internet protocol (IP) connection. These components may be conventional components such as those used in many conventional data processing systems, which may be configured to operate as described herein.

In particular, the processor 350 can be commercially available or custom microprocessor, microcontroller, digital signal processor or the like. The memory 336 may include any memory devices and/or storage media containing the software and data used to implement the functionality circuits or modules used in accordance with embodiments of the present invention. The memory 336 can include, but is not limited to, the following types of devices: ROM, PROM, EPROM, EEPROM, flash memory, SRAM, DRAM and magnetic disk. In some embodiments of the present invention, the memory 336 may be a content addressable memory (CAM).

As further illustrated in FIG. 12, the memory (and/or storage media) 336 may include several categories of software and data used in the data processing system: an operating system 352; application programs 354; input/output device drivers 358; and data 356.

As will be appreciated by those of skill in the art, the operating system 352 may be any operating system suitable for use with a data processing system, such as IBM®, AIX® or zOS® operating systems or Microsoft® Windows2000 or WindowsXP operating systems, Windows Visa, Windows7, Windows CE or other Windows versions from Microsoft Corporation, Redmond, Wash., Palm OS, Symbian OS, Cisco IOS, VxWorks, Unix or Linux™, Mac OS from Apple Computer, LabView, or proprietary operating systems. IBM, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 358 typically include software routines accessed through the operating system 352 by the application programs 354 to communicate with devices such as the input/output circuits 346 and certain memory 336 components. The application programs 354 are illustrative of the programs that implement the various features of the circuits and modules according to some embodiments of the present invention. Finally, the data 356 represents the static and dynamic data used by the application programs 354 the operating system 352 the input/output device drivers 358 and other software programs that may reside in the memory 336.

The data 356 may include test data of occupied cells and/or a time from load to test phase correlation data sets 326.

The module 355 can be provided as sub modules that are distributed over different servers or clients or may be provided as sub modules or subroutines on a respective server 390 (FIG. 11B) or client associated with the test system 100. The at least one server 390 can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud". Cloud storage may include a model of networked computer data storage where data is stored on multiple virtual servers, rather than being hosted on one or more dedicated servers.

As further illustrated in FIG. 12, according to some embodiments of the present invention, application programs 354 can include a Selective Cell Location Loading Module 355 and a User Interface Random or Selected Loading Module 325. The latter allows a user to select which type of loading of newly intaken specimen containers to activate for use. The application program(s) 354 may be located in a local server (or processor) and/or database or a remote server (or processor) and/or database, or combinations of local and remote databases and/or servers.

While the present invention is illustrated with reference to the application programs 354, and Modules 355, 325 in FIG. 12, as will be appreciated by those of skill in the art, other configurations fall within the scope of the present invention. For example, rather than being application programs 354 these circuits and modules may also be incorporated into the operating system 352 or other such logical division of the data processing system. Furthermore, while the application programs 355, 325 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 12 but may be provided by other arrangements and/or divisions of functions between data processing systems. For example, although FIG. 12 is illustrated as having various circuits and modules, one or more of these circuits or modules may be combined or separated without departing from the scope of the present invention.

The Selective Cell Loading Module 355 can define "Bottle Neighbors" as comprising three categories of neighboring cells: adjacent (on either side), opposite row (two closest cells in the other row) and further (on either side, but 1 cell away, further from adjacent). All bottle neighbors (also interchangeably discussed as neighboring cells $602n$) can be in the same rack.

The Selective Cell Loading Module 355 can provide a Cell Criticality list or chart that provides an array of cell criticality values corresponding to the number of cells. For example, an array of 432 values where there are 432 cells, (one for each cell) that determines a cell criticality value for neighboring cells that are empty or occupied and if the latter, how critical the bottle test is for that cell. A high value means that the loaded bottle is at a critical test phase or state. Unloaded or "empty" cells can have a value of 0 and loaded cells may be positive, negative or zero. This list can be recalculated for loaded cells every 10 minutes based on the changing dynamics of the cell evaluation. The values also change for a cell when a bottle is loaded or unloaded from that cell.

The Selective Cell Loading Module 355 can then generate an Available Cell List. This is a list of empty available cells that is typically recalculated and resorted at every bottle load. However, the list may include only a sub-set of available cells and is not required to include all available cells. Each list element contains two members, the cell number and the Neighbor Factor. The Neighbor Factor for an empty cell is determined based on the cell criticality values of its neighboring cells. In some embodiments, the Neighboring Factor is calculated as the sum of the cell criticality values of its neighboring cells, optionally with a weight depending on the neighbor's distance. The available cells can be sorted according to the Neighbor Factor, typically with the lowest value at the top of the list. The value at the top of the list is used to select the next cell to be loaded. Since there can be a latency between loading a cell and selecting the next cell (there may be a bottle in the robot assigned a cell that appears to be available), the last cell selected is stored and removed from the available cell list. Also, it is noted that the reverse order can be used, i.e., the lowest value placed at the bottom of the list and the cell at the bottom selected then removed from the available cell list.

Different events in the instrument can trigger certain calculations. For example, the Available Cell List can be updated based on:
  New test reading measurements every 5-10 minutes
  A bottle is ready to be loaded at the robot pickup station
  A bottle is unloaded to the chute or trash, or manually unloaded
  A bottle is loaded into a cell by the robot or manually
  Loading begins or ends; loader reinitializes
  Cell criticality values for neighboring cells of at least some empty cells can be calculated every 5-10 minutes during active loading, following the new test readings for specimen containers in occupied cells or respective neighboring cells. For every loaded bottle of neighboring cells associated with a respective empty cell that is available, a cell criticality value can be determined based on the updated test reading measurements and/or other defined factors such as time from load, content of the specimen container and the like.

Furthermore, for clarity, in general, the test system 100 can be configured to employ any known means in the art for monitoring and/or interrogating a specimen container 500 for the detection of microbial growth. As previously mentioned, the specimen containers 500 can be monitored continuously, or periodically, during incubation of the containers 500 in the test system 100, for the positive detection of microbial growth. Various design configurations for the detector 615 can be employed within the test system. For example, the detector 615 (FIGS. 11A, 11B) can comprise a single detector for an entire rack 600r or even an entire holding structure 600 or can comprise multiple detectors per rack and/or per holding structure 600.

In some embodiments, a detector 615 (FIGS. 11A, 11B) reads the sensor 514 incorporated into the bottom or base 506 of the container 500 (FIG. 4). The detection unit 615 can take colorimetric measurements as described in the U.S. Pat. Nos. 4,945,060; 5,094,955; 5,162,229; 5,164,796; 5,217, 876; 5,795,773; and 5,856,175, which are incorporated by reference as if recited in full herein. A positive container is indicated depending upon these colorimetric measurements, as explained in these patents. Alternatively, detection could also be accomplished using intrinsic fluorescence of the microorganism, and/or detection of changes in the optical scattering of the media. See, U.S. Pat. No. 8,512,975, the content of which was incorporated by reference as if recited in full herein above. In yet another embodiment, detection can be accomplished by detecting or sensing the generation of volatile organic compounds in the media or headspace of the container 500.

As previously described, the test system 100 may include a climate-controlled interior chamber (or incubation chamber) 620, for maintaining an environment to promote and/or enhance growth of any microbial agents (e.g., microorganisms) that may be present in the specimen container 500. In accordance with these embodiments, the test system 100 may include a heating element or hot air blower to maintain a constant temperature within the interior chamber 620. For example, in one embodiment, the heating element or hot air blower will provide and/or maintain the interior chamber 620 at an elevated temperature (i.e., a temperature elevated above room temperature). In other embodiments, the test system 100 may include a cooling element or cold air blower (not shown) to maintain the interior chamber at a temperature below room temperature. The interior chamber or incubation chamber can be at a temperature of from about 18° to about 45° C. The interior chamber 620 can be an incubation chamber and can be maintained at a temperature from about 35° C. to about 40° C., and preferably at about 37° C. In other embodiments, the interior chamber 620 may be maintained at a temperature below room temperature, for example from about 18° C. to about 25° C., and preferably at about 22.5° C. A particular advantage provided is the ability to provide a more constant temperature environment for promoting and/or enhancing microbial growth within a specimen container 500. The test system 100 can have a closed system, in which automated loading, transfer and unloading of specimen containers 500 occurs without the need to open any access panels that would otherwise disrupt the incubation temperature (from about 30° to 40° C., preferably from about 37° C.) of the interior chamber 620. If a door of the housing 104 is opened, a data flag may be generated for a test result of impacted specimen containers 500 to adjust a critical cell value which may help avoid false positives associated with this trigger event as the change in temperature in regions of the interior chamber 620 due to the open door can affect test results, particularly if in a critical phase of the test of the sample where decision thresholds may be relatively small, for example. One or more thermistors or other temperature sensors 606 (FIG. 5B) for a rack 600r, a row 603 or a set of cells 602 may be used to provide temperature feedback to the system controller 109 and/or location selection module 355 (FIGS. 11A, 11B, 12).

A cold (ambient or chilled) newly intaken specimen container 500 can cause a reflectance jump of an adjacent container 500 which can result in a false positive, particularly if the newly intaken specimen container 500 is loaded during a critical test phase of the adjacent container 500. Also, a reloaded (i.e., retest) bottle that is identified positive or without a test result during a first test and unloaded from the instrument 100 can result in a false positive if reloaded late in a test cycle for that reloaded bottle. The selective loading module 355 can weight the cell criticality parameter for an occupied cell holding a reloaded/retest specimen with an increased weight relative to even specimen containers in the critical test phase.

The test system 100 can include a system controller 109 (e.g., a computer control system) (FIGS. 11A, 11B) and firmware for controlling the various operations and mechanisms of the system. The system controller and firmware for controlling the operation of the various mechanisms of the system can be any known conventional controller and firmware known to those of skill in the art. In some embodiments, the controller 109 can perform the operations for controlling the various mechanisms of the system, including: automated selective loading, automated transfer, automated detection and/or automated unloading of specimen containers from/within the system. The controller 109 and firmware can also provide for identification and tracking of specimen containers 500 within the system.

The detection system 100 may also include a user interface 150 and associated computer control system for operating the loading mechanism, transfer mechanism, racks, agitation equipment, incubation apparatus, and receiving measurements from the detection units. These details are not particularly important and can vary widely. When a container is detected as being positive, the user can be alerted via the user interface 150 and/or by the positive indicator 190 (see, e.g., FIG. 1) becoming active (i.e., an indicator light turning on). As described herein, upon a positive determination, the positive container can be automatically moved to a positive container location 130, shown for example in FIGS. 1-3 for retrieval by a user.

The user interface 150 may also provide an operator or laboratory technician with status information regarding containers loaded into the detection system. The user interface may include one or more of the following features: (1) Touch screen display; (2) Keyboard on touch screen; (3) System status; (4) Positives alert; (5) Communications to other systems (DMS, LIS, BCES & other detection or identification Instruments); (6) Container or bottle status; (7) Retrieve containers or bottles; (8) Visual and audible Positive Indicator; (9) USB access (back ups and external system access); and (10) Remote Notification of Positives, System Status and Error Messages.

Non-Limiting Examples will be discussed below.

EXAMPLES

The BACT/ALERT® VIRTUO® instrument processes BacT/ALERT bottles containing clinical samples to detect microorganisms such as bacteria in the sample. The instrument automatically scans bottles and loads them into racks. Once the bottles are loaded in the racks, the instrument incubates and agitates the bottles, periodically measures the reflectance of the bottom of each bottle, and analyzes the reflectance measurements to determine a positive or negative result for each bottle.

It has been observed that bulk loading of ambient/room temperature ('cold') bottles can have a significant effect on previously loaded and incubated ('warm') bottles, which can cause 'warm' bottles to falsely register as positive. This happens when the 'cold' bottles have enough of an effect on the 'warm' incubated bottles (either by proximity or a bulk load) to suddenly decrease their temperature, which causes a jump in reflectance that sometimes exceeds the bottle result decision limits. This can prompt the instrument to label that bottle as a positive sample, which is considered a false positive.

When the temperature in the instrument is increased, the LED reflectance decreases, and vice versa. This happens because a temperature increase causes the anode and cathode to separate in distance, which in turn causes the current transferred between them to decrease. This decreased current then outputs a weaker light, which equates to a lower reflectance value.

By analyzing the bottles' reflectances in decision limits ('DerivHighLimit' and 'AreaHighLimit' values), it was determined that FA Plus and SA bottle types with broth only have the smallest decision limits but test samples with blood content may be more susceptible to temperature induced reflectance changes.

Generally stated, the effects of temperature changes on bottles with and without blood were evaluated as were LED reflectance values over time based on various loading of cells. In summary, nine refrigerated bottles (three each of SN, SA, and FA Plus with 10 mL blood added, 10 mL water added, or just broth) were loaded into a Virtuo instrument at 37° C. The reflectance values of each of the nine bottles were then recorded, and compared against the decision limits calculated by the instrument. This was done to determine which qualities are associated with smaller decision limits, or which bottle's reflectance readings can vary the least but still go past the decision limits, labeling that bottle positive.

Figure 13A:
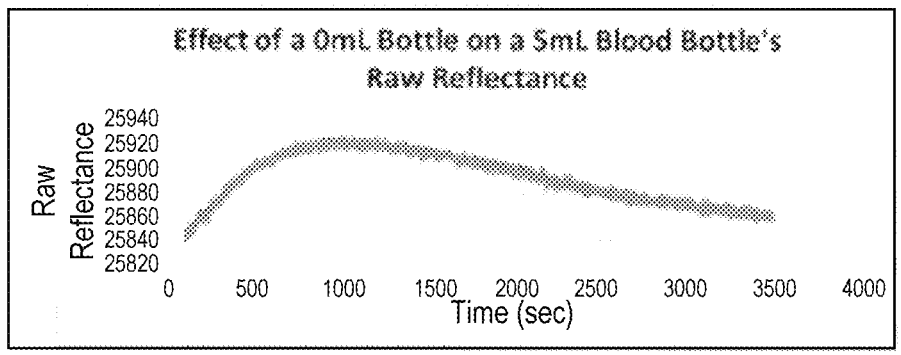
FIG. 13A is a graph of raw reflectance over time to show reflectance increase of an incubated bottle due to the effect of a 0 mL bottle loaded adjacent to the incubated bottle according to embodiments of the present invention.
Figure 13B:
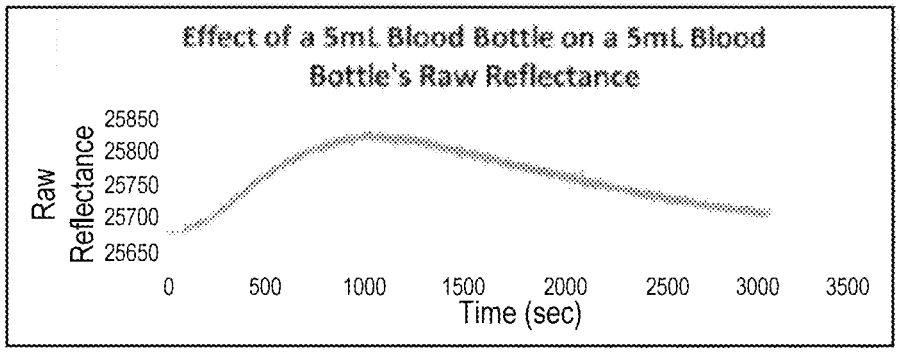
FIG. 13B is a graph of raw reflectance over time to show reflectance increase of an incubated bottle due to the effect of a bottle inoculated with 5 mL of blood loaded adjacent to the incubated bottle according to embodiments of the present invention

For example, a bottle with no added blood was loaded next to an incubated bottle inoculated with 5 mL of blood. The reflectance increase is about 80 counts as shown in FIG. 13A. A bottle inoculated with 5 mL of blood was loaded next to an incubated bottle inoculated with 5 mL of blood. The reflectance increase is about 130 counts as shown in FIG. 13B.

Figures 14A, 14B:
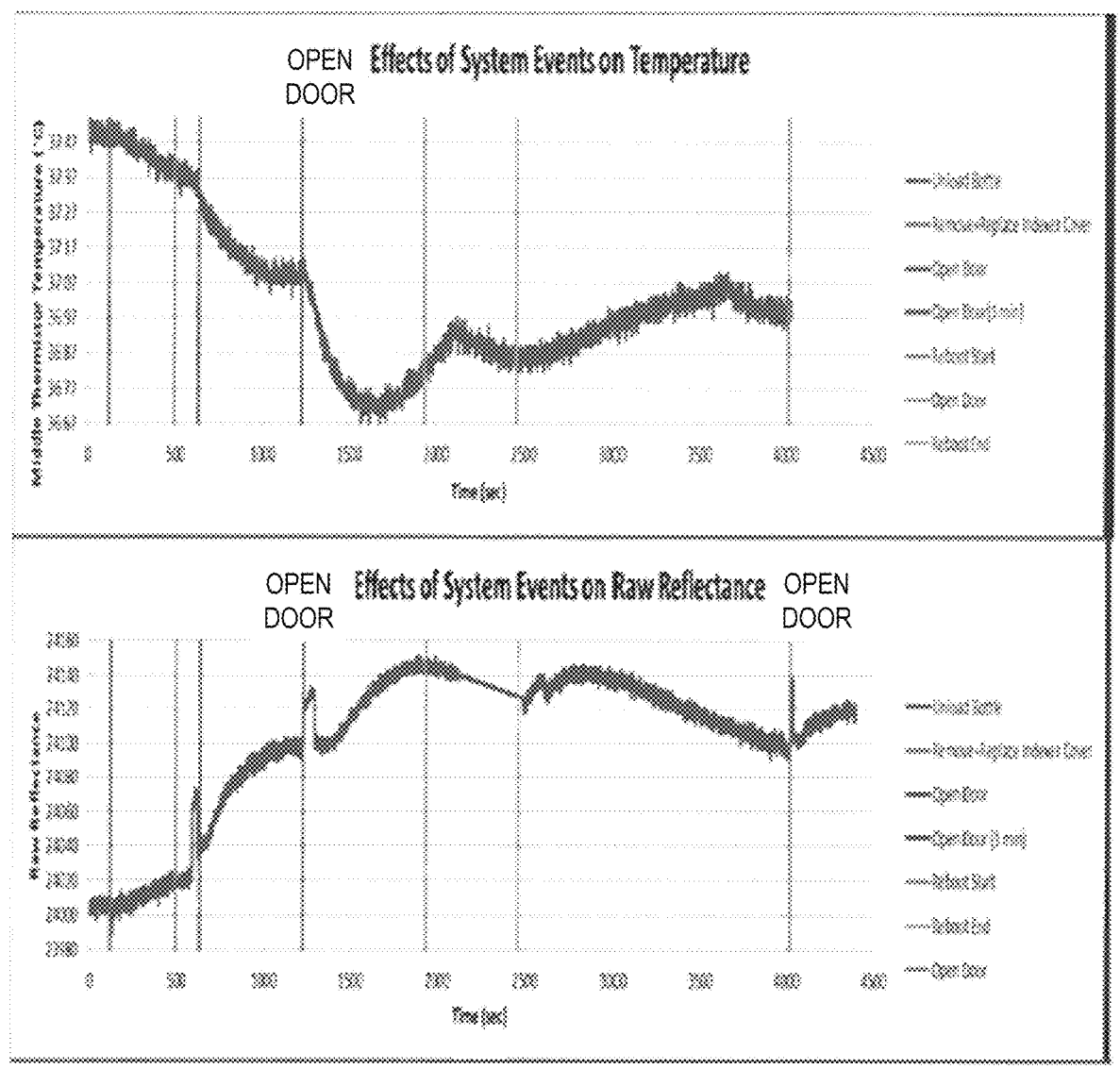
FIG. 14A is a graph of temperature (Celsius) versus time (seconds) for various system trigger events according to embodiments of the present invention.
FIG. 14B is a graph of raw reflectance versus time (seconds) for the same system trigger events shown in FIG. 14A according to embodiments of the present invention.

FIGS. 14A and 14B show that door open/close events have the most significant effect on the internal temperature (middle thermistor temperature, FIG. 14A) and reflectance (FIG. 14B). These open door events are identifiable on the temperature graph of FIG. 14A as sharp declines, and on the reflectance graph (FIG. 14B) as sharp increases lasting for only a matter of seconds, which then fall back down to their original position. Thus, opening of the instrument door during incubation causes a steep drop in temperature, which causes an increase in reflectance and a unique curve shape associated with the door open events.

Figure 15A:
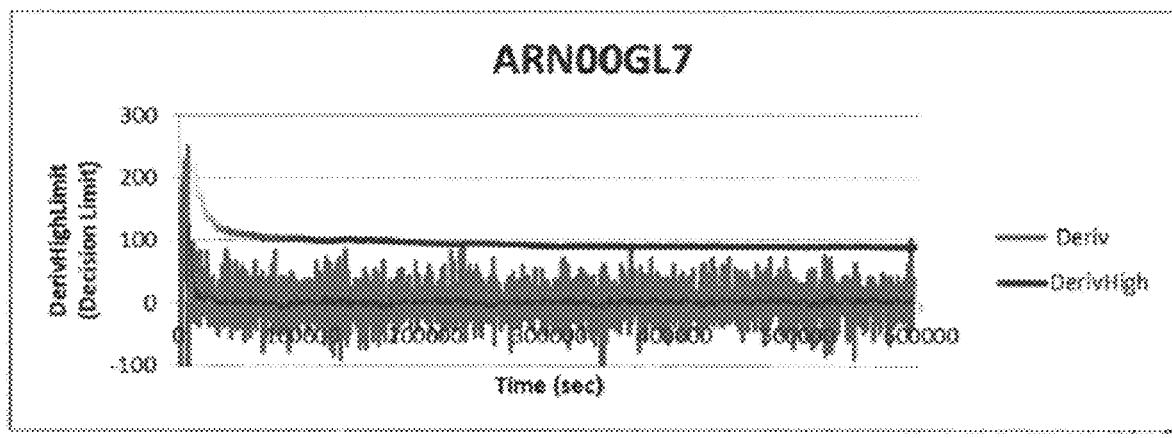
FIG. 15A is a graph (Decision Limit) over time (seconds) identifying three successive phases of a test for a specimen container according to embodiments of the present invention.

Graphs were analyzed alongside intermediate calculations that are used to determine a bottle's positive/negative result. By analyzing the bottles' reflectances in accordance with these decision limits ('DerivHighLimit' of FIG. 15A, 15B) and 'AreaHighLimit' values, it was determined that FA Plus and SA bottle types with broth only have the smallest decision limits.

In addition, bottles with added water do not experience a significant reflectance increase over time, but all bottles with added blood do, along with SN and SA bottles containing broth only. The bottles with blood undergo a spike much larger than the bottles with broth only—reflectance increases ranging from about 600-1400 counts versus increases of only about 400 counts in the broth only bottles.

Figure 15B:
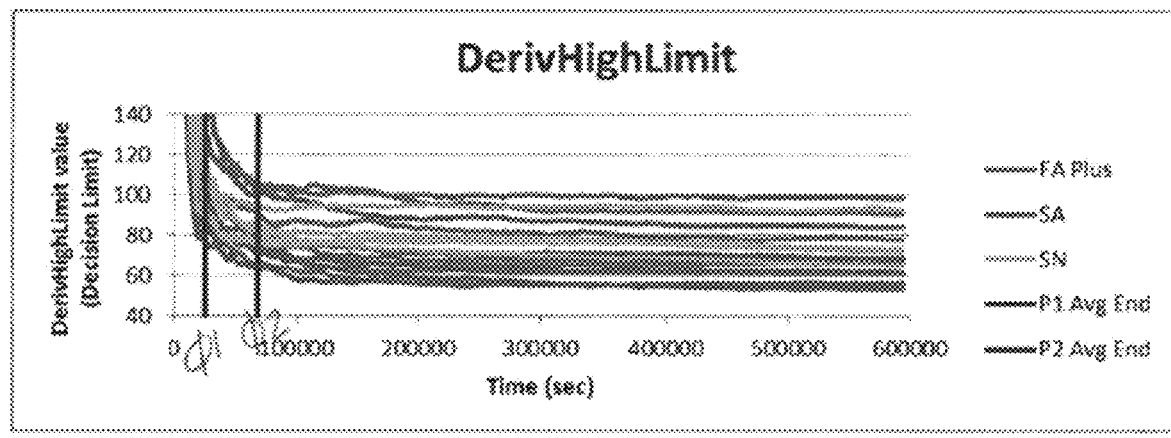
FIG. 15B is a graph (Decision Limit) versus time (seconds) for three different specimen containers with different test phases illustrating phase 1 and phase 2 average end points of the first and second different test phases according to embodiments of the present invention.

FIG. 15B shows data regarding the partitioning of the DerivHighLimit decision limits, generated as intermediate calculations from a continuous monitoring test. The plots were split into three different phases, in order to determine a time frame for when a bottle becomes most susceptible ("critical" test phase) to temperature changes during its incubation. This happens during Phase 3, where the limits level out after a certain amount of time. On average, Phase 1 ends at 7 hours, and Phase 2 ends at 18 hours. So, bottles loaded after 18 hours are most likely to be affected by peripheral bottle loads, as that is when the limits are at their smallest values.

The testing shows that peripheral loads surrounding an incubated bottle do have a noteworthy effect on the bottle's reflectance measurements. If this bottle is in the critical part of testing, where the decision limits are the smallest, a load peripheral to it (i.e., adjacent neighbors) and potentially more peripheral neighbors such as at a +1 offset could cause it to be falsely determined as positive.

The following definitions can be assigned to example parameters that can be used for selective loading with the example pseudo code provided below, by way of example only.

Reload: A bottle that was loaded, but had previously been loaded and unloaded.

Derivative: The slope between the last two sample readings.

Derivative Positive Count: The number of consecutive readings where the Derivative value is above the Upper Derivative limit.

Area Positive Count: The number of consecutive readings where the Relative Area Under the Curve value is above the Relative Area Under the Curve limit.

Upper Derivative Limit: A data-dependent decision limit based on the derivative.

Data Gap Flag: Set to 1 if there has been a readings time gap in the data of greater than 30 minutes. The flag is reset after a varying period of time that is data dependent.

Relative Area Under the Curve: A calculation of the change in area of the data reflectance vs. time curve.

Adjacent Weight: Weight given to the cells immediately adjacent to a given cell in the same row of the same rack. Typically 1.0.

Opposite Weight: Weight given to the cells diagonally adjacent to a given cell in the opposite row of the same rack. Typically 0.7.

Further Weight: Weight given to the cells two cells away from a given cell in the same row of the same rack. Typically 0.3.

End Factor: Criticality value given to the imaginary cells at the end of the rack. (e.g. There is no left neighbor to cell 1, but it is given the value of End Criticality as if there were a cell there.) Typically −5.

Initial Factor: Criticality value given to newly loaded bottles and very recently reloaded bottles. Typically −10.

Positive Derivative Factor: Criticality given to a bottle called positive due to Derivative. Typically 50.

Positive Non-Derivative Factor: Criticality given to a bottle called positive due to reason other than Derivative. Typically 50.

Count Factor: Criticality used when calculating bottles during the critical growth phase. Typically 25.

Count Factor Limit: Limit of the maximum Count Factor value. Typically 150.

Reload Factor: Criticality value given to a reloaded bottle. Typically 50.

Residual Factor: Criticality value given to bottles with a high derivative value, but no other weight. Typically 25.

Loaded Factor: Criticality value given to a loaded bottle that has no other criticality. Typically 15.

Gap Factor: Criticality value used when a bottle has the Data Gap Flag set. Typically 100.

Pseudocode (Copyright 2018, BioMerieux, Inc., all Rights Reserved)

```
CellCriticality[432]; // array of values, one per cell
Initialize CellCriticality array to 0; // initializes cells to 0 so that unloaded cells have 0 value
Get List of loaded cells from database;
For each loaded cell
{
  Get data from intermediary_calculations table and bottle table for this bottle;
  Critical Value = 0;
  // add weight to non-derivative positives, to help prevent a second reason for positive
  If bottle is positive due to other reason than derivative
    CriticalValue += POSITIVE_NON_DERIVATIVE_FACTOR; // 50
  // add negative weight to recent loads and reloads to induce clustering of bulk loaded bottles
  If bottle was first-time loaded in last 2 hours or a reloaded within the last ten minutes
    CriticalValue += INITIAL_FACTOR; // −10
  Else
  {
    // If not a recent load, add weight for high derivative (critical growth phase)
    TempValue += (derivative_positive_count + area_pos_count) * COUNT_FACTOR; // 0-150
    If TempValue > COUNT_FACTOR_LIMIT // 150
      Temp Value = COUNT_FACTOR_LIMIT;
    CriticalValue += Temp Value;
    // Give weight to recently reloaded bottles (>10 min), since these are sensitive
    If bottle was reloaded in last 2 hours
      CriticalValue += RELOAD_FACTOR; // 50
  }
  // Give a minimum weight if a bottle is positive, this may occur when a positive is past the growth phase
  If CriticalValue < POSITIVE_DERIVATIVE_FACTOR and bottle is positive due to derivative
    CriticalValue = POSITIVE_DERIVATIVE_FACTOR; // 50
  If CriticalValue = 0
  {
    // If no other weight exists, add weight based on a high derivative value
    CriticalValue += abs(derivative / upper_derivative_limit) * RESIDUAL_FACTOR; // 0-25
    If CriticalValue > RESIDUAL_FACTOR // 25
      CriticalValue = RESIDUAL_FACTOR;
  }
  If CriticalValue = 0
  {
    // If no other weight exists, then add weight for loaded bottles, to favorl oading in empty areas
    CriticalValue = LOADED_FACTOR; // 15
  }
  // Add a weight for if there is a critical determination following a gap in the data
  If bottle has data_gap_flag > 0
    CriticalValue += GAP_FACTOR; // 100
}
```

When a Bottle is Unloaded
Zero the value for that cell in the CellCriticality array.
When a Bottle is Loaded
Set the value of the cell in the CellCriticality array to INITIAL_FACTOR (−10).

Determination of Empty Cell to Load into

As a bottle is ready to load via the robot, a cell to load is determined from a sorted list of empty cells according to the Criticality Value of its neighboring cells. The cell with the lowest sum is chosen as the next cell to load. The criticality of the imaginary cells at the ends of the racks are given value −5. This initially favors the ends of the racks for loading.

Pseudocode

```
AdjacentNeighbors[2];
OppositeNeighbors[2];
FurtherNeighbors[2];
AvailableCellList {Cell, NeighborSum}; // List has two values, Cell is from database, NeighborSum is calculated
BottleInRobot; // Cell number assigned to bottle that is currently in the robot
Get List of Available cells from database; // not loaded, not disabled, no faults, not scheduled for cal/check
If BottleInRobot > 0
  Remove BottleInRobot cell from list;
For each Cell in the AvailableCellList
{
  NeighborSum = 0;
  Obtain precalculated list of neighbors for the Cell;
  For each of the 2 Adjacent Cells
    NeighborSum += (CellCriticality of AdjacentNeighbor) *
```

```
ADJACENT_WEIGHT; // 1.0
For each of the 2 Opposite Cells
    NeighborSum += (CellCriticality of OppositeNeighbor) *
    OPPOSITE_WEIGHT; // 0.7
For each of the 2 Further Cells
    NeighborSum += (CellCriticality of FurtherNeighbor) *
    FURTHER_WEIGHT; // 0.3
}
Sort AvailableCellList based on the NeighborSum values in the
list,
lowest value at top of list
CellToLoad = Cell associated with top of sorted AvailableCell-
List;
BottleInRobot = CellToLoad;
When a Loading Begins, Loading Re-initializes, or Loading Ends
Set BottleInRobot = 0
```

FIGS. 16A, 16B & 17-20 illustrate exemplary flow charts of actions for the smart loading of specimen containers.

Figure 16A:
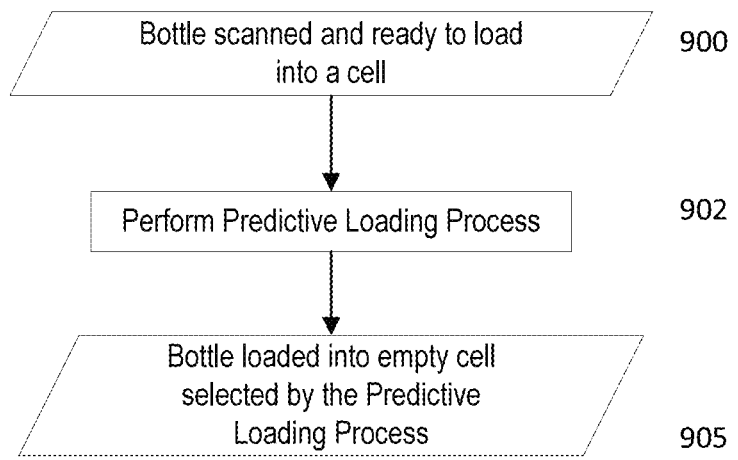
FIG. 16A is an example flow chart of actions for smart loading of containers according to embodiments of the present invention.

Referring to FIG. 16A, a bottle is scanned and ready to load into a cell (block 900). The predictive loading process is performed (block 902). The bottle is loaded into an empty cell selected by the predictive loading process (block 905).

Figure 16B:
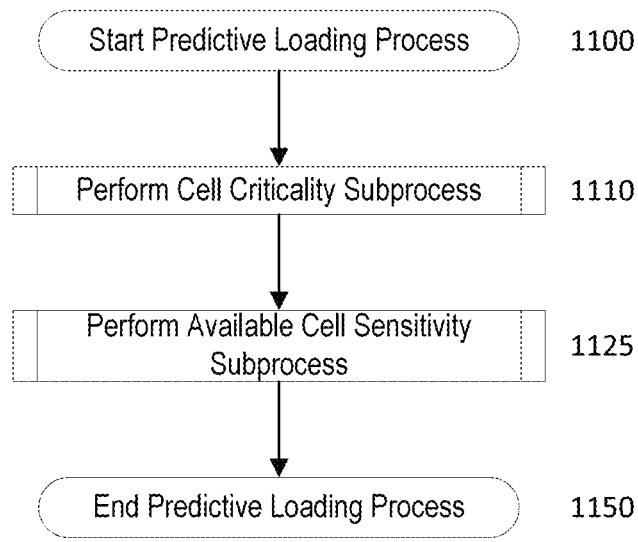
FIG. 16B is another example flow chart for actions for smart loading of containers according to embodiments of the present invention.

FIG. 16B illustrates that a predictive loading process can be initiated or started (block 1100). A cell criticality subprocess can be performed (block 1110). An available cell sensitivity subprocess can be performed (block 1125). The predictive loading process can be completed for a respective specimen container (block 1150).

Figure 17:
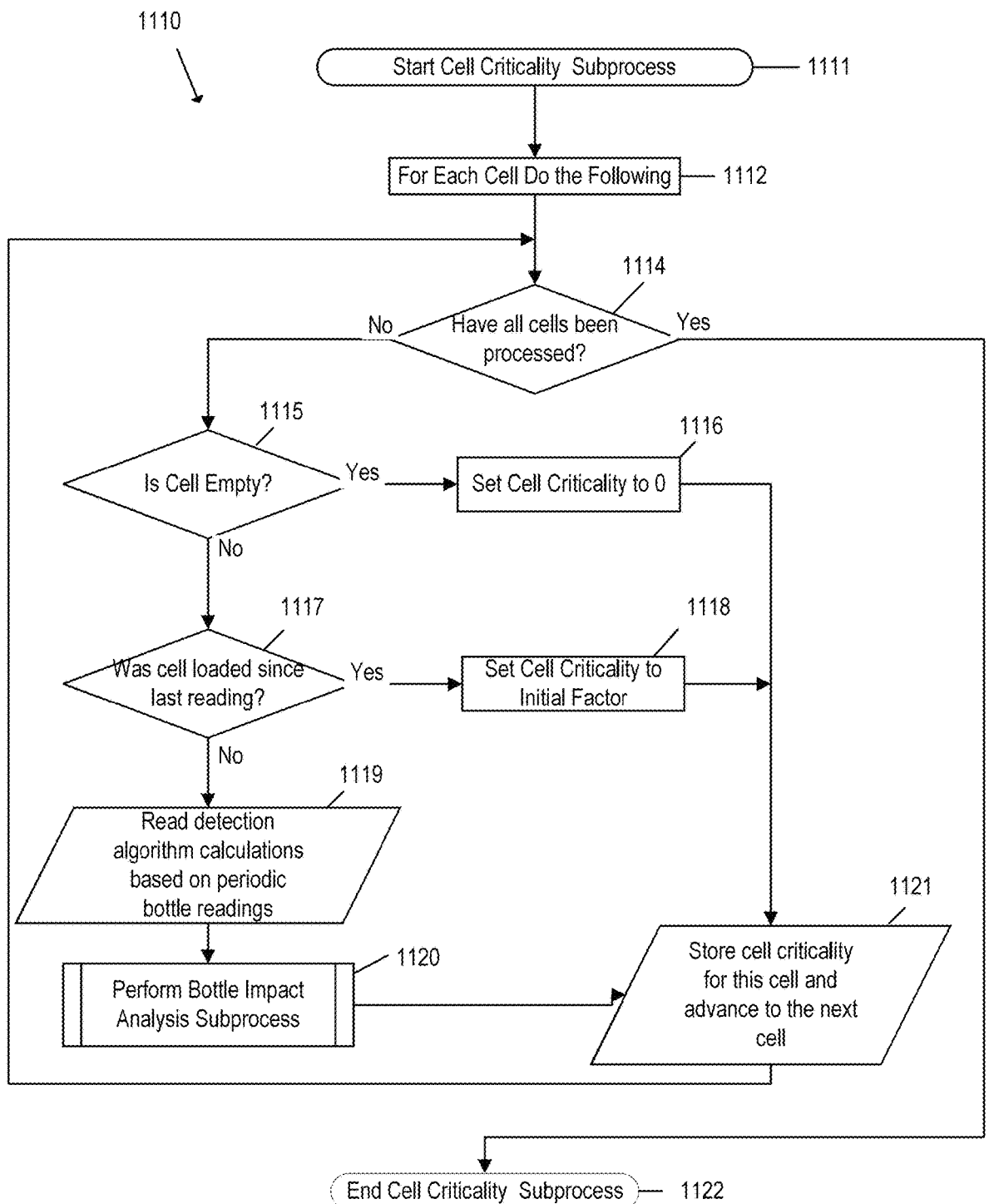
FIG. 17 is an example flow chart of a cell criticality evaluation process that can be used for smart loading of containers according to embodiments of the present invention.

FIG. 17 is an example of the cell criticality subprocess 1110 in FIG. 16B. A cell criticality subprocess is started (block 1111). For each cell, the following decision tree process can be performed (block 1112). Have all cells been processed? (block 1114). Is cell empty? (block 1115). If yes, set cell criticality to 0 (block 1116). If no, was cell loaded since last reading? (block 1117). If yes, set cell criticality to initial factor (block 1118). If no, read detection algorithm calculations based on periodic bottle readings (block 1119). Perform bottle impact analysis subprocess (block 1120). Store cell critically for this cell and advance to the next cell (block 1121). The cell criticality subprocess can be ended (block 1122).

Figure 18:
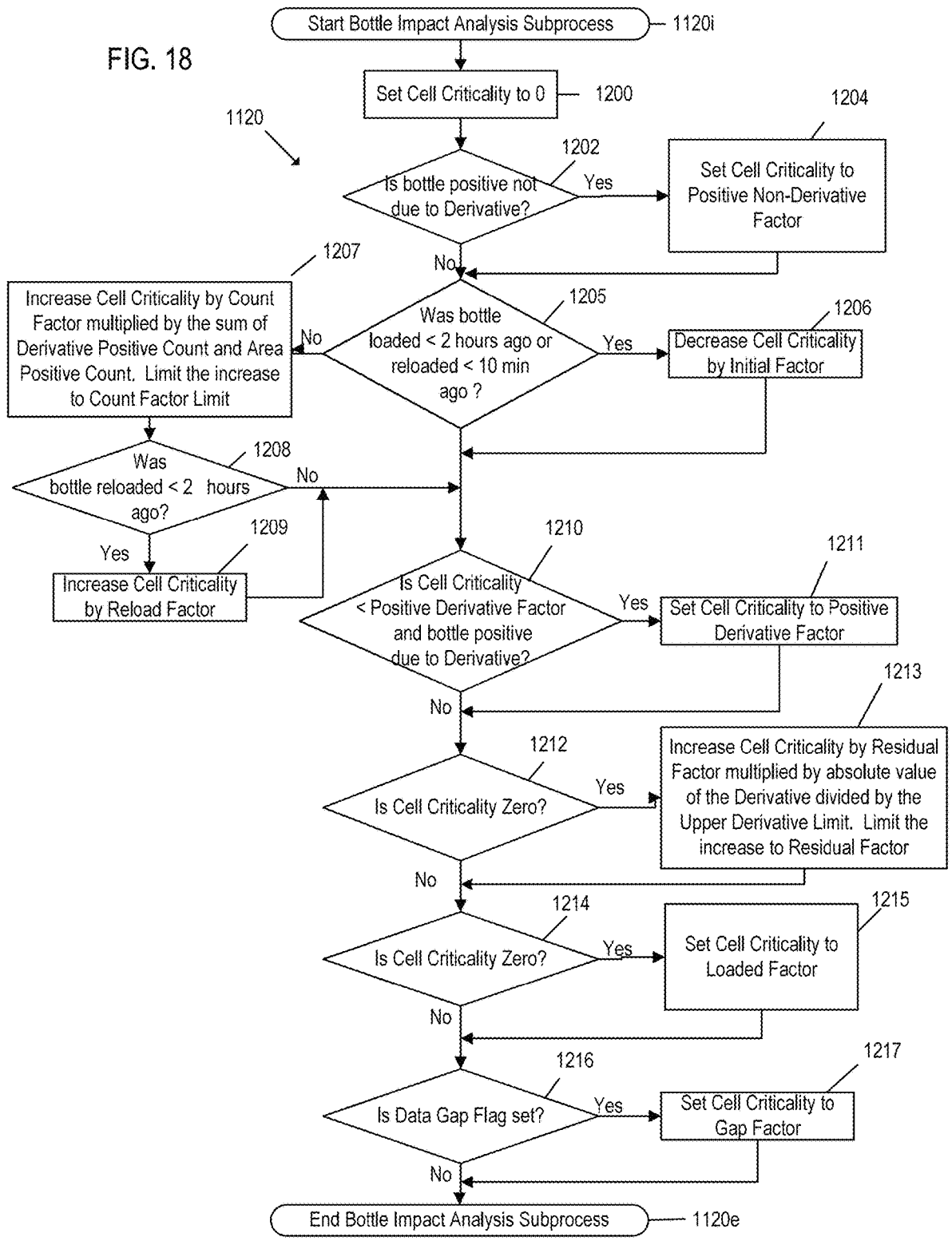
FIG. 18 is an example flow chart of a container impact analysis that can be used in the cell criticality process according to embodiments of the present invention.

FIG. 18 is an example bottle impact subprocess (bock 1120) shown in FIG. 17. A bottle impact analysis subprocess can be started (block 1120i). Set cell criticality to 0 (block 1200). Is bottle positive not due to Derivative? (block 1202) If yes, set cell criticality to positive non-derivative factor (block 1204). If no, was bottle loaded <2 hours ago or reloaded <10 minutes ago? (block 1205). If yes, decrease cell criticality by initial factor (block 1206). If no, increase cell criticality by count factor multiplied by the sum of derivative positive count and area positive count. Limit the increase to count factor limit (block 1207). Was bottle reloaded <2 hours ago? (block 1208) If yes, increase cell criticality by reload factor (block 1209). If no, is cell criticality <positive derivative factor and bottle positive due to derivative? (block 1210). If yes, set cell criticality to positive derivative factor (block 1211). If no, is cell criticality zero? (block 1212). If yes, increase cell criticality by residual factor multiplied by absolute value of the derivative divided by the upper derivative limit. Limit the increase to residual factor (block 1213). If no, is cell criticality zero? (block 1214). If yes, set cell criticality to loaded factor (block 1215). If no, is data gap flag set? (block 1216). If yes, set cell criticality to gap factor (block 1217). If no, end bottle impact analysis subprocess (block 1120e).

Figure 19:
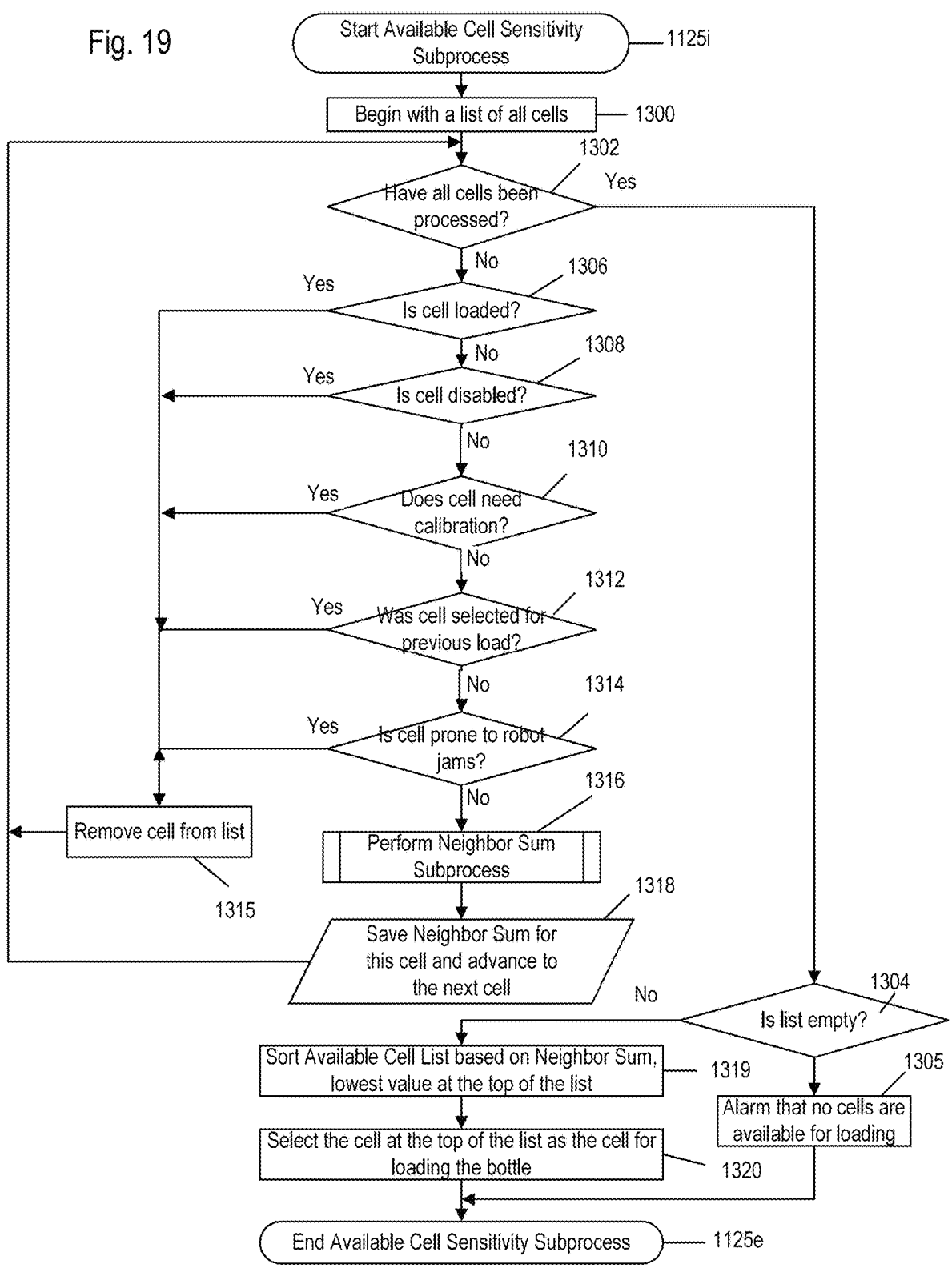
FIG. 19 is an example flow chart of an available cell sensitivity evaluation process that can be used for smart loading of containers according to embodiments of the present invention.

FIG. 19 is an example available cell sensitivity subprocess 1125 shown in FIG. 16B. The available cell sensitivity subprocess can be started (block 1125i). Begin with a list of all cells (block 1300). Have all cells been processed? (block 1302). If yes, is list empty? (block 1304). Alarm that no cells are available for loading (block 1305). If no, is cell loaded? (block 1306). Is cell disabled? (block 1308). Does cell need calibration? (block 1310). Was cell selected for previous load? (block 1312). Is cell prone to robot jams? (block 1314). Remove cell from list (block 1315). Perform neighbor sum subprocess (block 1316). Save neighbor sum for this cell and advance to next cell (block 1318). Sort available cell list based on neighbor sum, lowest value at the top of the list (block 1319). Select the cell at the top of the list as the cell for loading the bottle (block 1320). End available cell sensitivity subprocess (block 1125e).

Figure 20:
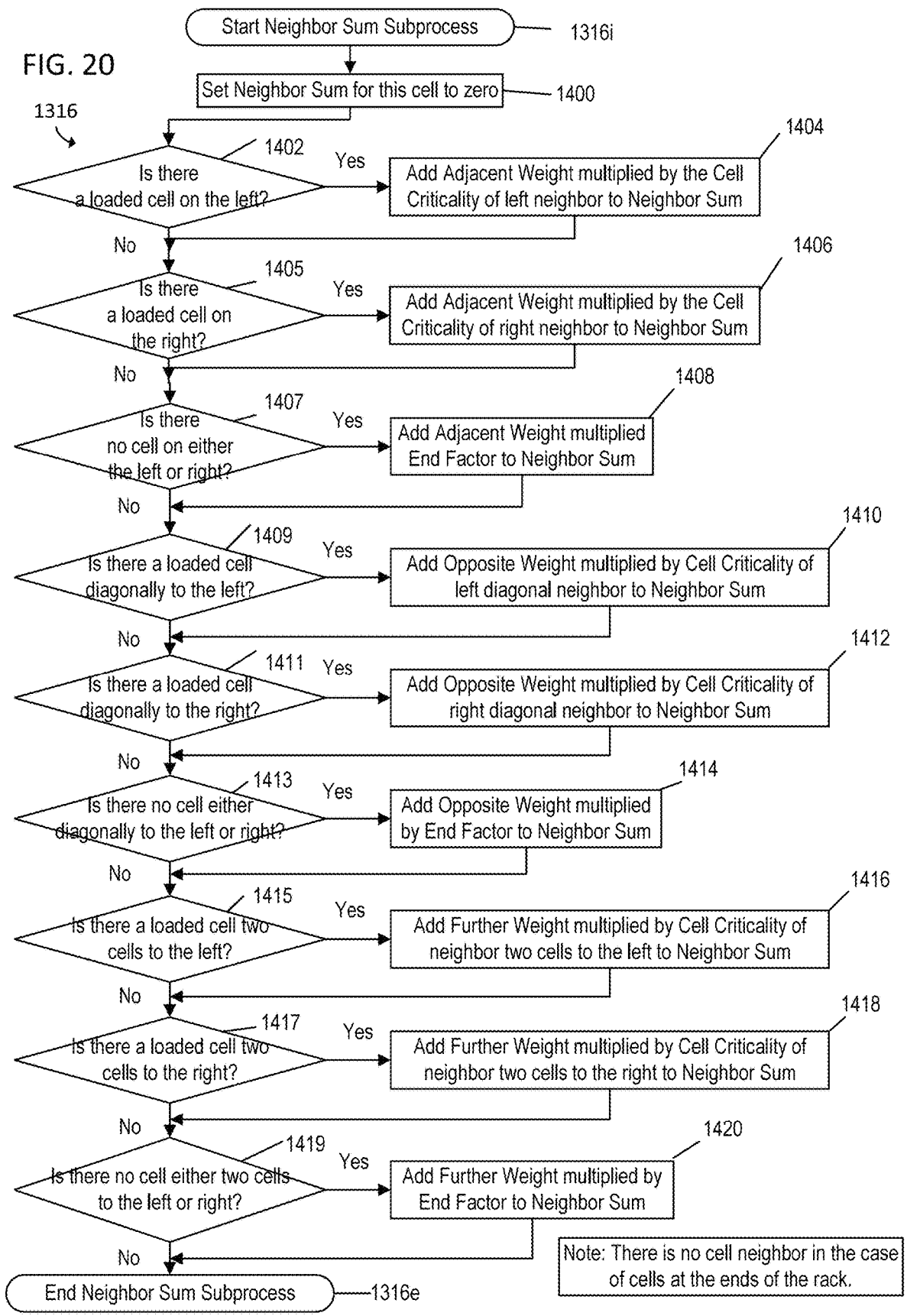
FIG. 20 is an example flow chart of a neighbor sum process that can be used in the available cell sensitivity process for smart loading of containers according to embodiments of the present invention.

FIG. 20 is an example neighbor sum subprocess 1316 shown in FIG. 19. A neighbor sum subprocess can be started (block 1316i). Set neighbor sum for this cell to zero (block 1400). Is there a loaded cell on the left? (block 1402). If yes, add adjacent weight multiplied by the cell criticality of left neighbor to neighbor sum (block 1404). If no, is there a loaded cell on the right? (block 1405). If yes, add adjacent weight multiplied by the cell criticality of right neighbor to neighbor sum (block 1406). If no, is there no cell on either the left or right? (block 1407). If yes, add adjacent weight multiplied end factor to neighbor sum (block 1408). Is there a loaded cell diagonally to the left? (block 1409). If yes, add opposite weight multiplied by cell criticality of left diagonal neighbor to neighbor sum (block 1410). If no, is there a loaded cell diagonally to the right? (block 1411). If yes, add opposite weight multiplied by cell criticality of right diagonal neighbor to neighbor sum (block 1412). Is there no cell either diagonally to the left or right? (block 1413). If yes, add opposite weight multiplied by end factor to neighbor sum (block 1414). If no, is there a loaded cell two cells to the left? (block 1415). If yes, add further weight multiplied by cell criticality of neighbor two cells to the left to neighbor sum (block 1416). If no, is there a loaded cell two cells to the right? (block 1417). If yes, add further weight multiplied by cell criticality of neighbor two cells to the right to neighbor sum (block 1418). If no, is there no cell either two cells to the left or right? (block 1419). If yes, add further weight multiplied by end factor to neighbor sum (block 1420). If no, end neighbor sum subprocess (block 1316e).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method for selecting an empty cell to place an incoming specimen container in a test instrument, comprising:
   electronically determining and/or obtaining cell availability of cells of a holding structure in an incubated test chamber and for each of a plurality of open and available cells:
      electronically identifying neighboring cells to each of the plurality of open and available cells;

electronically determining whether each of the identified neighboring cells are occupied or empty and, if occupied, electronically evaluating a time from load of a specimen container held therein to evaluate the test status of the specimen container held therein, wherein evaluating the test status includes identifying whether the specimen container held therein is in a critical test phase based at least in part on the time from load; then electronically selecting one of the plurality of open and available cells based at least in part on the electronically determining and electronically evaluating; and then electronically directing a loading mechanism to electromechanically load the incoming specimen container into the selected one of the plurality of open and available cells, wherein the selecting is carried out to identify the plurality of open and available cells for risk of inducing a false positive in the specimen containers of occupied ones of the identified neighboring cells if loaded with the incoming specimen container, the risk of inducing a false positive being increased if the incoming specimen container is loaded during the critical test phase of the specimen containers of the occupied cells of the identified neighboring cells.

2. The method of claim 1, wherein the electronically selecting is carried out by electronically ranking at least some of the plurality of open and available cells each with a cell criticality parameter based at least in part on whether the identified neighboring cells are occupied or empty and the test status of the specimen containers of the occupied cells of the identified neighboring cells, and wherein the ranking is carried out using the cell criticality parameter defined for each of the neighboring cells of each of the plurality of open and available cells and mathematically summing the cell criticality parameter of each of the neighboring cells for each of the plurality of open and available cells to provide each open and available cell with a ranking number for the ranking.

3. The method of claim 1, wherein the electronically selecting comprises characterizing the identified neighboring cells for each one of the plurality of open and available cells as one of a plurality of different types and weighting directly adjacent ones of the neighboring cells with a first weight, weighting immediately adjacent cells in a row above and/or below with a second weight, and weighting +1 spaced apart neighboring cells with a third weight, and optionally weighting more peripheral cells with a fourth weight, wherein the first weight is greater than the second and third weights and the optional fourth weight.

4. The method of claim 1, wherein the holding structure provides the cells as an array of rows and columns of cells, each having a unique X, Y address in a coordinate system, the method further comprising identifying virtual cells as empty cells of the neighboring cells for each open and available cell residing adjacent an end of a row of cells, wherein the selecting is carried out using a cell criticality parameter defined for each of the neighboring cells of each of the plurality of open and available cells and mathematically summing the cell criticality parameter of each of the neighboring cells including the virtual cells for a respective open and available cell residing at an end of a row of cells to provide each open and available cell with a ranking or sorting number for the selecting, and wherein the cell criticality parameter is calculated based at least in part on whether the identified neighboring cells are occupied or empty and the test status of the specimen containers in occupied cells of the identified neighboring cells.

5. The method of claim 1, further comprising updating the cell availability upon unloading and/or loading of specimen containers into the cells of the holding structure to provide an updated inventory of a current plurality of open and available cells, then repeating the electronically evaluating of the test status of specimen containers held in respective occupied cells, and then repeating the selecting of the updated inventory of the current plurality of open and available cells.

6. The method of claim 1, further comprising updating the cell availability periodically during an active loading period of the test instrument to provide an updated inventory of a current plurality of open and available cells, then repeating the electronically evaluating of the test status of a specimen container held in respective occupied cells, and then repeating the selecting of the updated inventory of the current plurality of open and available cells.

7. The method of claim 1, wherein the critical test phase is associated with a lower decision threshold range relative to earlier test phases.

8. The method of claim 1, wherein the incoming specimen container is at a temperature below a temperature of the incubated test chamber.

9. The method of claim 1, wherein each of the incoming specimen container and specimen containers in the occupied cells comprise an optical sensor, and wherein the electronically evaluating evaluates reflectance data to identify the test status and determine if each specimen container in the occupied cells is at the critical test phase.

10. The method of claim 1, wherein the selecting identifies and excludes at least one of the plurality of open and available cells as having an increased risk of causing a false positive relative to others of the plurality of open and available cells if loaded with the incoming specimen container at a time period of the selecting, and wherein the increased risk corresponds to a higher score of risk than other of the plurality of open and available cells having a lesser risk and a lower score of risk value.

11. The method of claim 1, wherein the plurality of open and available cells are all of the open and available cells in the holding structure, and wherein the holding structure has an array of rows and columns of the cells, and wherein the test instrument comprises at least one detector that, is configured to obtain test data of the specimen containers in occupied cells.

12. A method for selecting an empty cell to place a specimen container in a test instrument, comprising:
electronically determining and/or obtaining cell availability of cells of a holding structure in an incubated test chamber and for each of at least some of a plurality of open and available cells:
electronically identifying neighboring cells to each of the at least some of the plurality of open and available cells;
electronically determining whether each of the identified neighboring cells are occupied or empty and, if occupied, electronically evaluating a time from load of a specimen container held therein to evaluate the test status of the specimen container held therein, wherein evaluating the test status includes identifying whether the specimen container held therein is in a critical test phase based at least in part on the time from load; then
defining a cell criticality parameter for each of the neighboring cells of each of the at least some of the plurality of open and available cells and mathematically summing the cell criticality parameter of each of the neighboring cells for each of the plurality of open and available cells to provide each open and available cell with a neighboring factor number, wherein the cell criticality parameter is defined based at least in part on whether the identified neighboring cells are occupied or empty and the test status of the occupied cells of the identified neighboring cells; and then electronically directing a loading mechanism to electromechanically load the incoming specimen container into a selected one of the plurality of open and available cells based on the neighboring factor number.

13. A test system for evaluating samples, comprising:
a housing;
an incubation chamber in the housing;
a holding structure comprising a plurality of cells in a plurality of rows held in the incubation chamber;
a loading mechanism in the housing configured to load specimen containers of respective samples into the plurality of cells of the holding structure;
at least one detector configured to detect test data of the specimen containers while held in the plurality of cells of the holding structure to determine whether a respective specimen container tests positive or negative; and
at least one processor coupled to the loading mechanism and configured to:
obtain data of cell availability and/or determine cell availability of cells of the holding structure and, for each of at least some of a plurality of open and available cells:
identify defined neighboring cells to each of the at least some of the plurality of open and available cells;
determine whether each of the identified neighboring cells are occupied or empty;
wherein, if occupied, evaluate a time from load of a specimen container held therein to evaluate the test status of the specimen container held therein, wherein evaluating the test status includes identifying whether the specimen container held therein is in a critical test phase based at least in part on the time from load; then
calculate a neighboring factor number for each of the at least some of the plurality of open and available cells based at least in part on whether the identified neighboring cells are occupied or empty and the test status of the occupied cells of the identified neighboring cells; and then
direct the loading mechanism to load the incoming specimen container into a selected one of the plurality of open and available cells based on the calculated neighboring factor number.

14. The test system of claim 13, wherein the at least one processor sorts and/or ranks values of respective neighboring factor numbers using the calculated neighboring factor number of each of the at least some of the plurality of open cells to select one cell for loading the incoming specimen container.

15. A computer program product comprising a non-transitory computer-readable medium with instructions stored thereon, that when executed by a processor, perform the steps comprising:
determine and/or obtain cell availability of cells of a holding structure in an incubated test chamber;
for each of a plurality of open and available cells:
identify neighboring cells to each of the plurality of open and available cells;
determine whether each of the identified neighboring cells are occupied or empty, and if occupied, evaluate a time from load of a specimen container held therein to evaluate the test status of the specimen container held therein, wherein evaluating the test status includes identifying whether the specimen container held therein is in a critical test phase based at least in part on the time from load; then
rank and/or sort each of the plurality of open and available cells based on a threshold value or a value relative to each other based at least in part on whether the identified neighboring cells are occupied or empty and the test status of the occupied cells of the identified neighboring cells; and then
direct a loading mechanism to electromechanically load an incoming specimen container into a selected one of the open and available cells based on the rank and/or sorted status,
wherein the ranking and/or sorting is carried out to identify empty cell locations for risk of inducing a false positive in specimen containers of occupied ones of the identified neighboring cells if loaded with an incoming specimen container, the risk of inducing a false positive being increased if the incoming specimen container is loaded during a critical test phase of specimen containers of the occupied cells of the identified neighboring cells.

* * * * *